(12) United States Patent
Wright

(10) Patent No.: US 11,686,262 B1
(45) Date of Patent: Jun. 27, 2023

(54) METHODS AND SYSTEMS FOR GASEOUS FUEL MANAGEMENT

(71) Applicant: Transportation IP Holdings, LLC, Norwalk, CT (US)

(72) Inventor: Gregory Wright, Longmont, CO (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/651,511

(22) Filed: Feb. 17, 2022

(51) Int. Cl.
*F02M 21/02* (2006.01)
*F02D 41/00* (2006.01)
*B61C 5/00* (2006.01)
*F02D 41/22* (2006.01)

(52) U.S. Cl.
CPC ............ *F02D 41/0027* (2013.01); *B61C 5/00* (2013.01); *F02D 41/221* (2013.01); *F02M 21/0293* (2013.01); *F02D 2041/224* (2013.01); *F02D 2200/0602* (2013.01); *F02D 2200/0611* (2013.01)

(58) Field of Classification Search
CPC .............. F02D 41/0027; F02D 41/221; F02D 2041/224; F02D 2200/0602; F02D 2200/0611; F02M 21/0293
USPC .............. 123/1 A, 3, 27 GE, 525, 526, 527, 123/DIG. 12, DIG. 13; 701/103, 104, 701/105, 107; 73/35.06
See application file for complete search history.

(56) References Cited

U.S. PATENT DOCUMENTS 2,460,197 A    1/1949  Smith, Jr.

*Primary Examiner* — Hai H Huynh
(74) *Attorney, Agent, or Firm* — McCoy Russell LLP

(57) ABSTRACT

Various methods are provided for managing a fuel system of a vehicle. In one example, the method may include enclosing, at least partially, a gaseous fuel delivery, storage, and/or consumption element of the vehicle. The method may include sensing an indication of gaseous fuel in an unintended region and generating an alert and/or adjusting an actuator in response to the sensed gaseous fuel above a threshold.

20 Claims, 11 Drawing Sheets

METHODS AND SYSTEMS FOR GASEOUS FUEL MANAGEMENT

BACKGROUND

Technical Field

Embodiments of the subject matter disclosed herein relate to managing a gaseous fuel system of a vehicle.

Discussion of Art

Vehicles, such as rail vehicles and other off-highway vehicles, may rely on combustion of one or more fuels at an internal combustion engine. Vehicles using combustion power sources may employ strategies to contain fuel, reduce emissions, and manage accumulation of potential emissions.

Strategies for fuel system management include the use of fuel storage reservoirs. The fuel storage reservoir may have a suitable structure for storing a specific type of fuel. In one example, the fuel storage reservoir may be adapted for cryogenic storage of liquefied natural gas (LNG) or liquefied hydrogen. As another example, the fuel storage reservoir may be used to store a fuel in a liquid state at ambient temperature and pressure, such as diesel or ammonia. In yet another example, the fuel storage reservoir may store a fuel as a compressed gas, such as hydrogen or natural gas. In one example, a vehicle may include at least one fuel tender, which may carry one or more fuel. In each instance, the fuel tender may be equipped with various mechanisms and devices for storage of the particular fuel and mechanisms for delivering the fuel to an engine for combustion. Another strategy includes mounting fuel storage containers open to ambient to reduce enclosed accumulation of potential emissions. It may be desirable to have a strategy for managing a fuel system that differs in function that those that are currently available.

BRIEF DESCRIPTION

In one embodiment, a method for managing a fuel system of a vehicle may include enclosing, at least partially, a gaseous fuel delivery, storage, and/or consumption element of the vehicle; and sensing an indication of gaseous fuel in an unintended region; and generating an alert and/or adjusting an actuator in response to the sensed gaseous fuel above a threshold.

DETAILED DESCRIPTION

Figure 1:
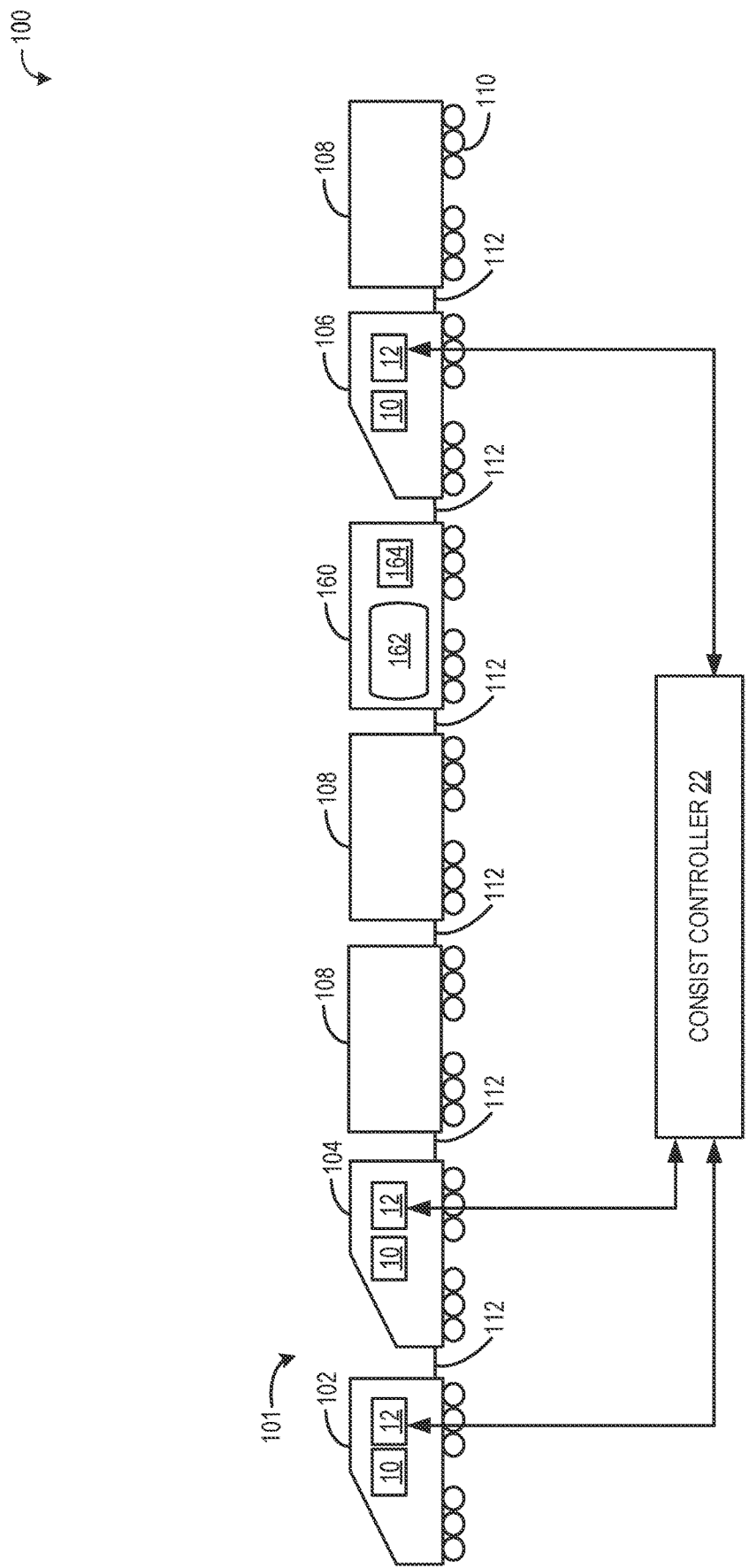
FIG. 1 shows an example embodiment of a train including a locomotive consist.

Embodiments of the invention are disclosed in the following description and may relate to a method for managing a fuel system. Such a fuel system may be positioned in a vehicle system. Suitable vehicle systems may include an internal combustion engine designed to combust one or more types of fuel where one of the fuels is gaseous. Aspects of the invention may enable enclosed storage of fuel system components of the vehicle and provide management strategies for presence of gaseous fuel in an unintended region. In examples where a vehicle system uses one or more gaseous fuels for combustion, gaseous fuel may emit from components of the fuel system and may migrate to unintended regions (as also referred to herein as emission migration). Gaseous fuel may emit from storage reservoirs such as from valves. Gaseous fuel may also emit from pipes or lines for delivery from a storage reservoir to a consumption element such as an internal combustion engine or fuel cell. For some gaseous fuels, it may be desirable to minimize emission, particularly in an enclosed area. For example, some gases, such as hydrogen, emission no greater than a threshold air ratio may be maintained. A current solution for reducing emission migration is mounting fuel reservoirs to ambient so there is abundant air to maintain the gas to air ratio below the threshold. However, there may be situations where enclosing fuel stores and/or fuel consumption elements is desirable. A method for managing a fuel system including containment and emission migration control strategies may address some of the aforementioned challenges.

A technical effect of a method for managing a fuel system of a vehicle including fuel system containment and emission migration control strategies is that service interruption related to emission migration may be minimized. In one embodiment, a method for fuel system management may include enclosing, at least partially, a gaseous fuel delivery, storage, and/or consumption element of the vehicle. Enclosures and other regions of the vehicle may be monitored by sensors, such as pressure sensors and/or gas concentration sensors, for sensing gaseous fuel. In one embodiment, upon detection of gaseous fuel above a threshold in a monitored area of the vehicle, the method may include generating an alert and/or adjusting an actuator in response. As one example, the threshold may include a ratio of hydrogen gas to oxygen. Adjusting an actuator in response to greater than threshold gaseous emission may reduce the ratio in the enclosure.

Enclosing various components of the fuel system has an advantage of containing potential emission and reducing emission migration. Adjusting an actuator in response to greater than threshold emission enables controlled enclosure venting and air ratio management. In one embodiment, controlled enclosure venting and air ratio management may be achieved by adjusting an actuator controlling airflow to an eductor of the enclosure, and in another embodiment, may include operating a pump for a duration. In this way, fresh air may be drawn through the enclosure, gaseous fuel emission may be vented from the unintended region to atmosphere, and the ratio of the emission to air in the enclosure may be reduced. The ratio of emission to air in an enclosure may additionally or alternatively be reduced by adjusting an actuator to provide a displacement gas such as an inert gas within the enclosure. In one example, the displacement gas may be provided to an enclosure in a first single operation that floods the unintended region with inert gas in response to a first higher level of sensed gaseous fuel in the unintended region, and a repeated operation providing limited flow of inert gas to the unintended region in response to a second lower level of sensed gaseous fuel in the unintended region. Strategies for managing a fuel system such as adjusting actuators to vent emission, draw fresh air into the enclosure, and/or flush enclosures with inert gas have the advantage of enabling enclosed containment of gaseous fuel and fuel system components, and should gaseous fuel emission greater than threshold emission occur, emission migration to unintended regions may be managed during vehicle operation thus reducing service interruption.

Figure 2:
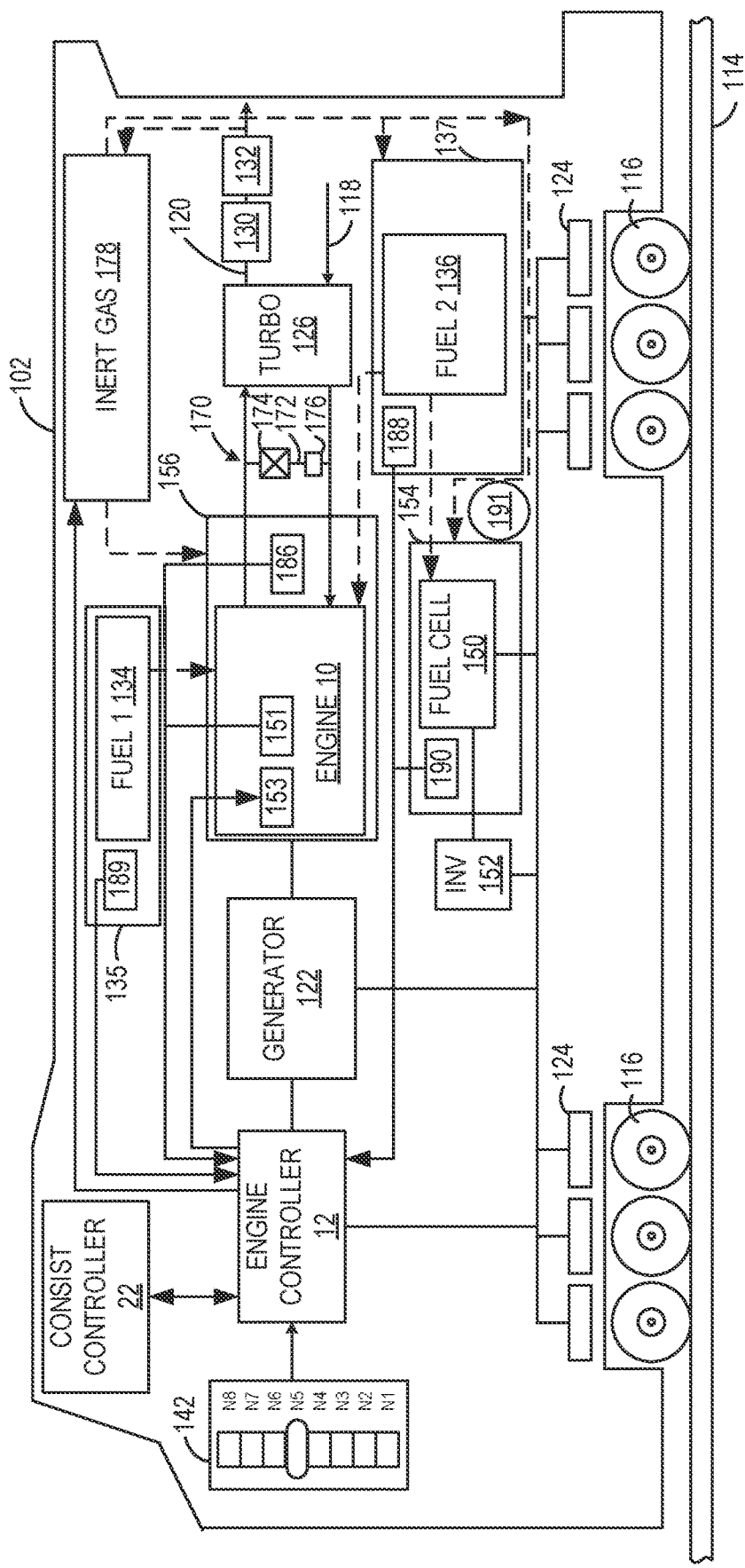
FIG. 2 shows a schematic diagram of an example embodiment of a locomotive from FIG. 1 with a dual fuel engine having fuel system management features.
Figure 3:
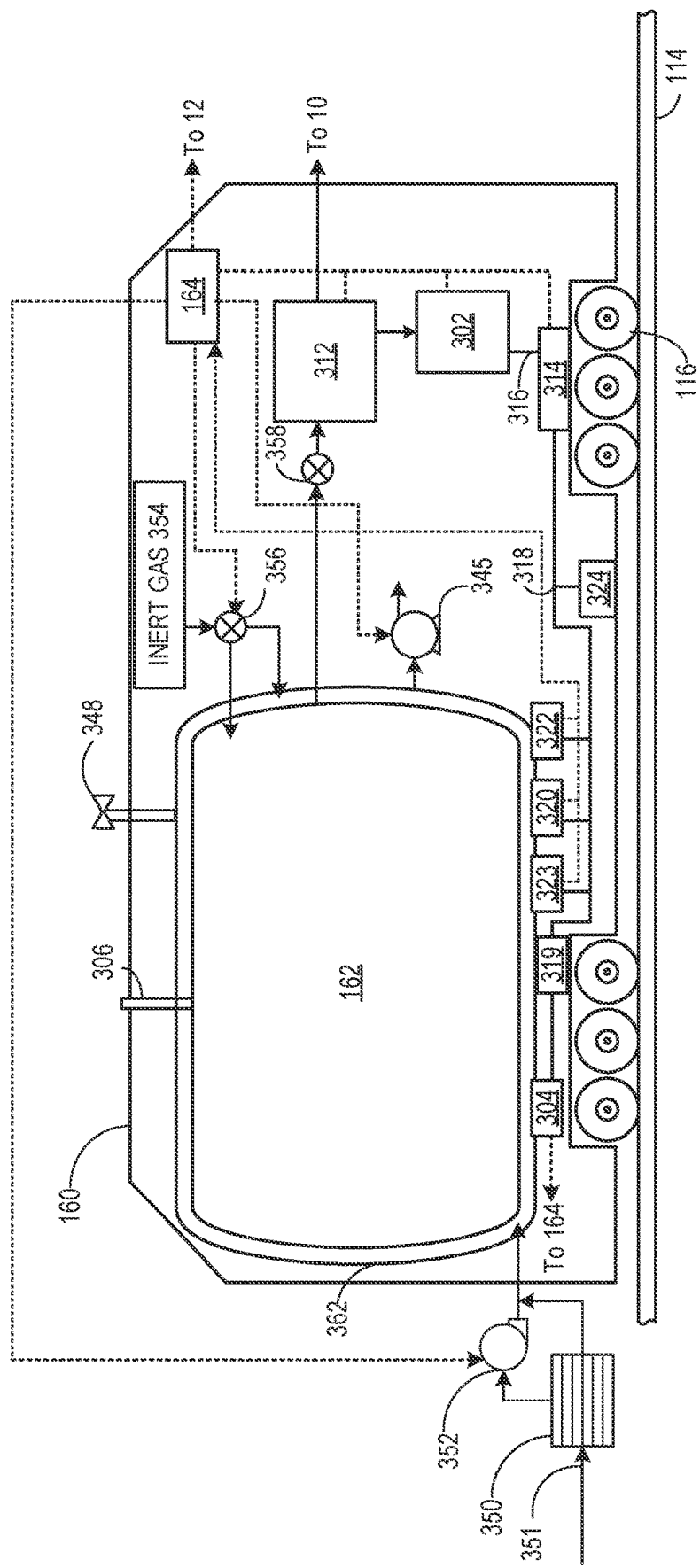
FIG. 3 shows a schematic diagram of an example embodiment of a fuel tender having fuel system management features.
Figure 5:
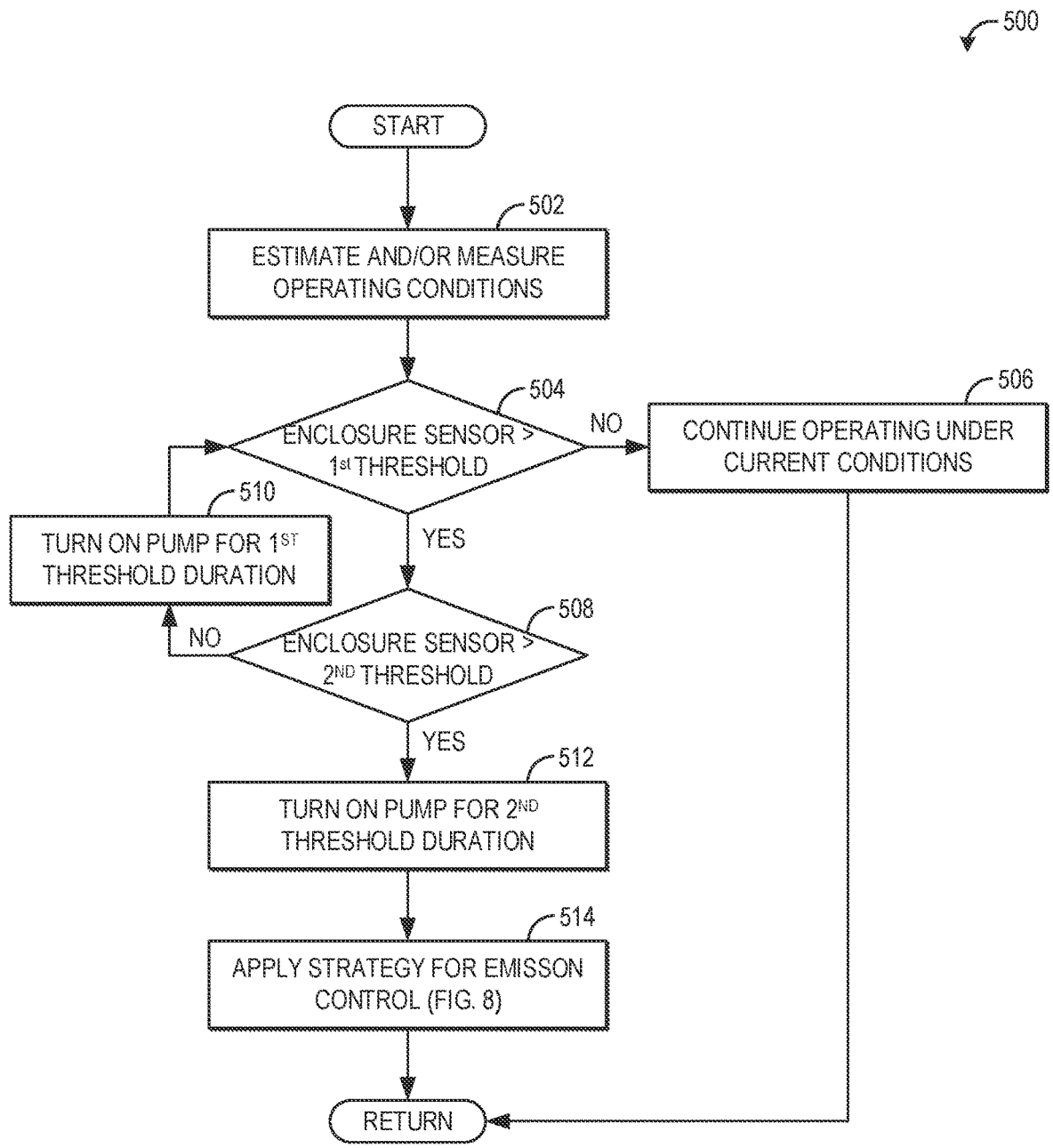
FIG. 5 shows an example of a method for managing a fuel system including a vacuum pump.
Figure 6:
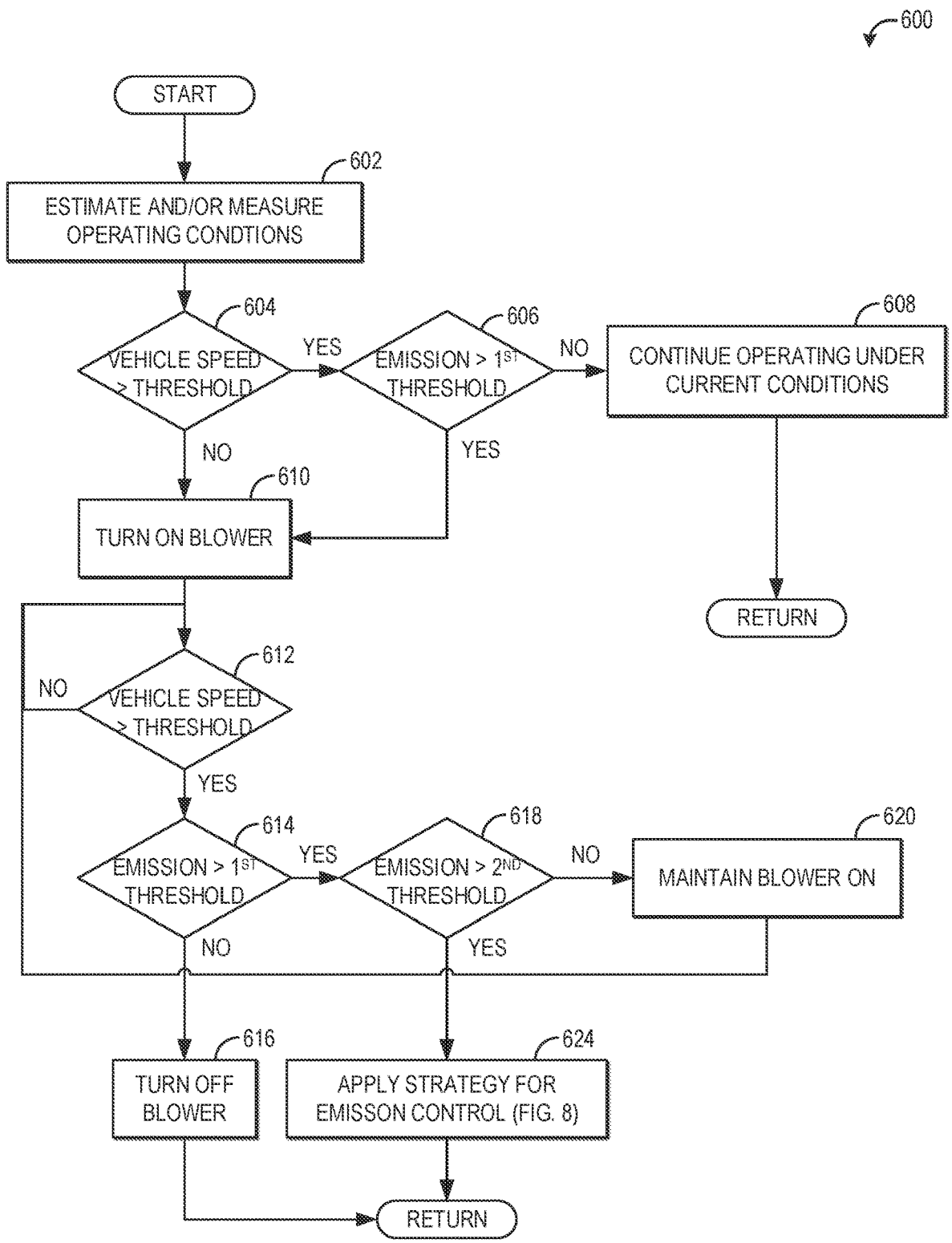
FIG. 6 shows an example of a method for managing a fuel system including a blower.
Figure 7:
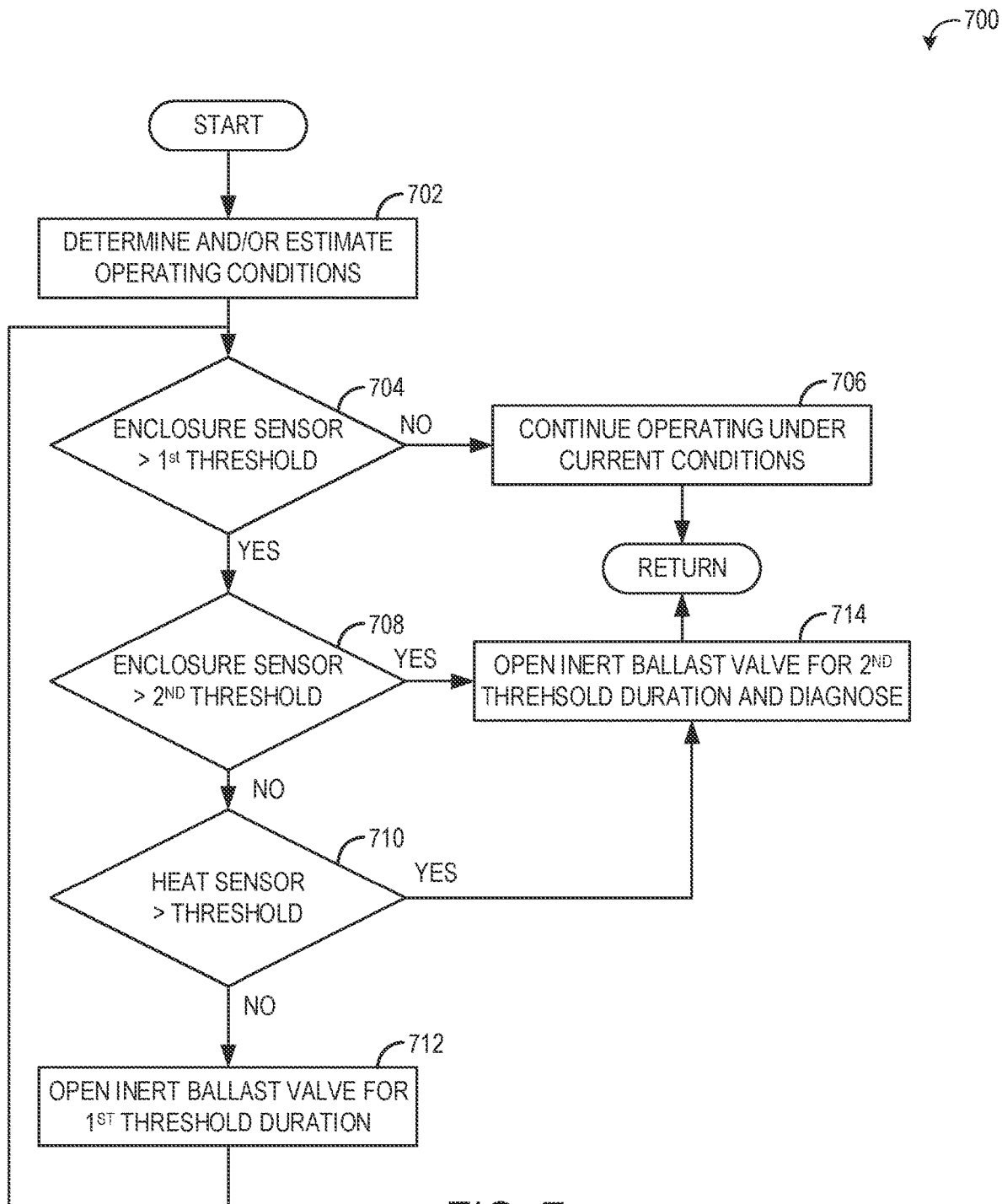
FIG. 7 shows an example of a method for managing a fuel system including an inert ballast reservoir.
Figure 8:
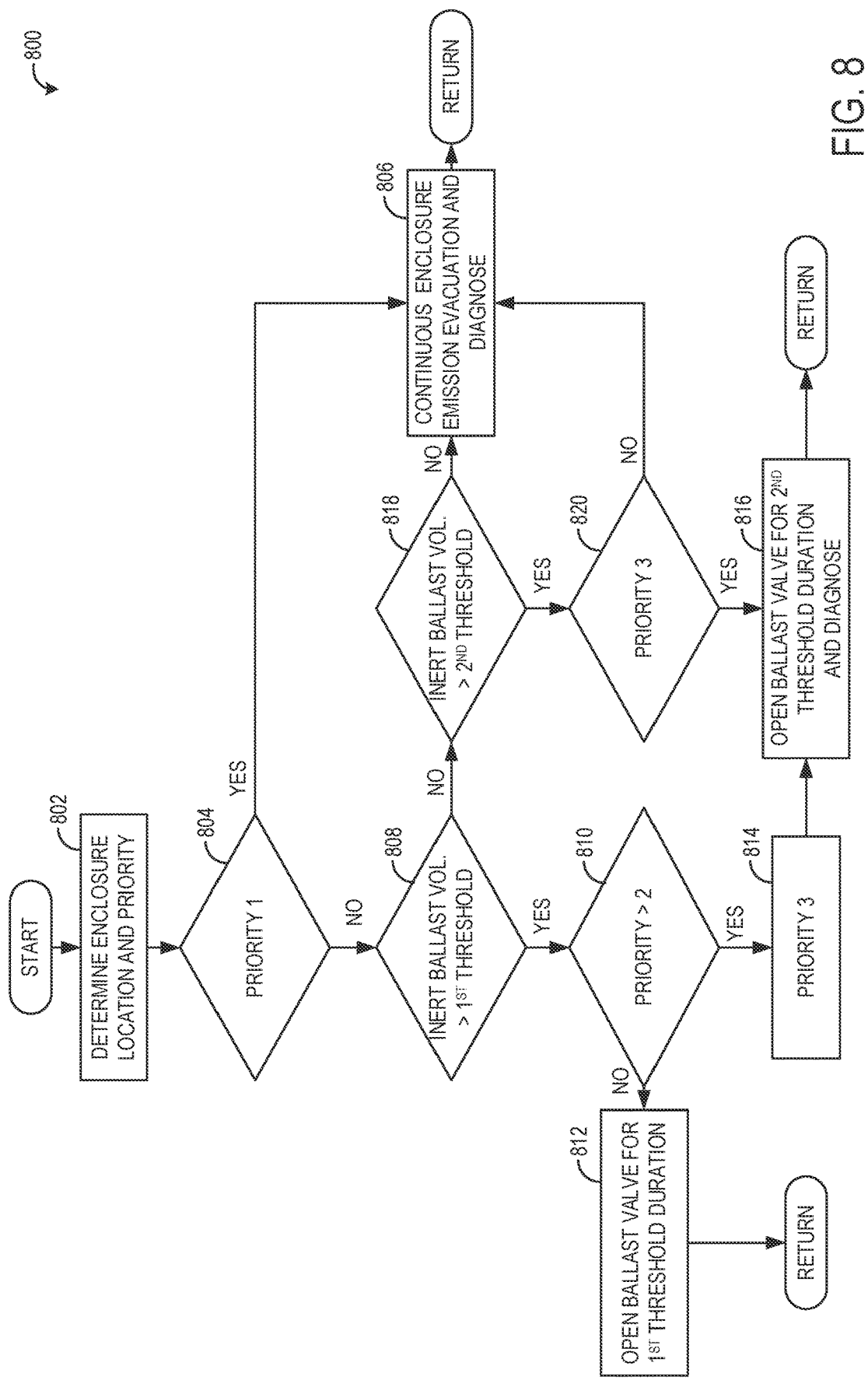
FIG. 8 shows an example control routine for prioritizing use of an inert ballast reservoir as part of a method for managing a fuel system.
Figure 9:
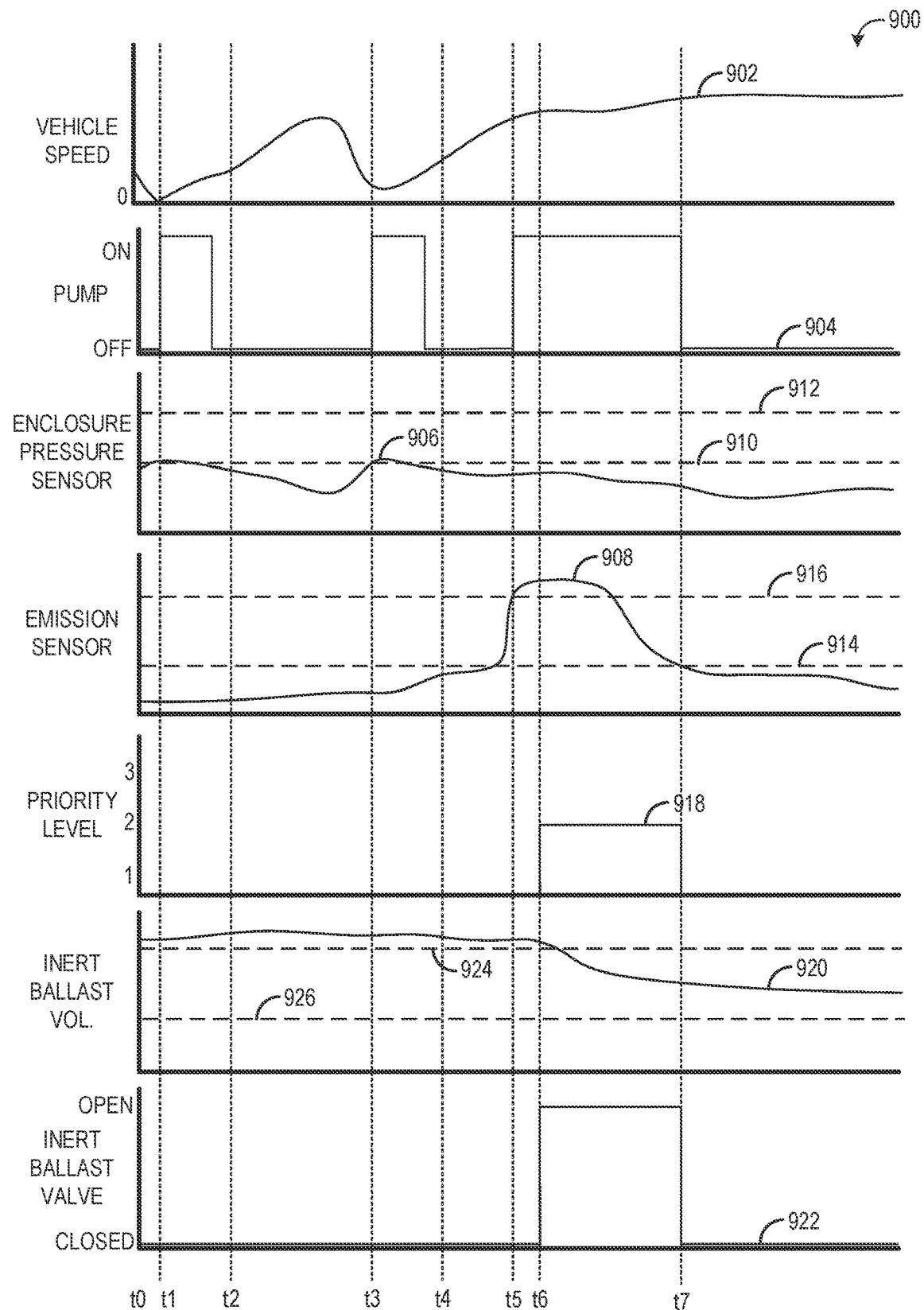
FIG. 9 shows a timing diagram of a prophetic example use of the methods of FIG. 5 and FIG. 8.
Figure 10:
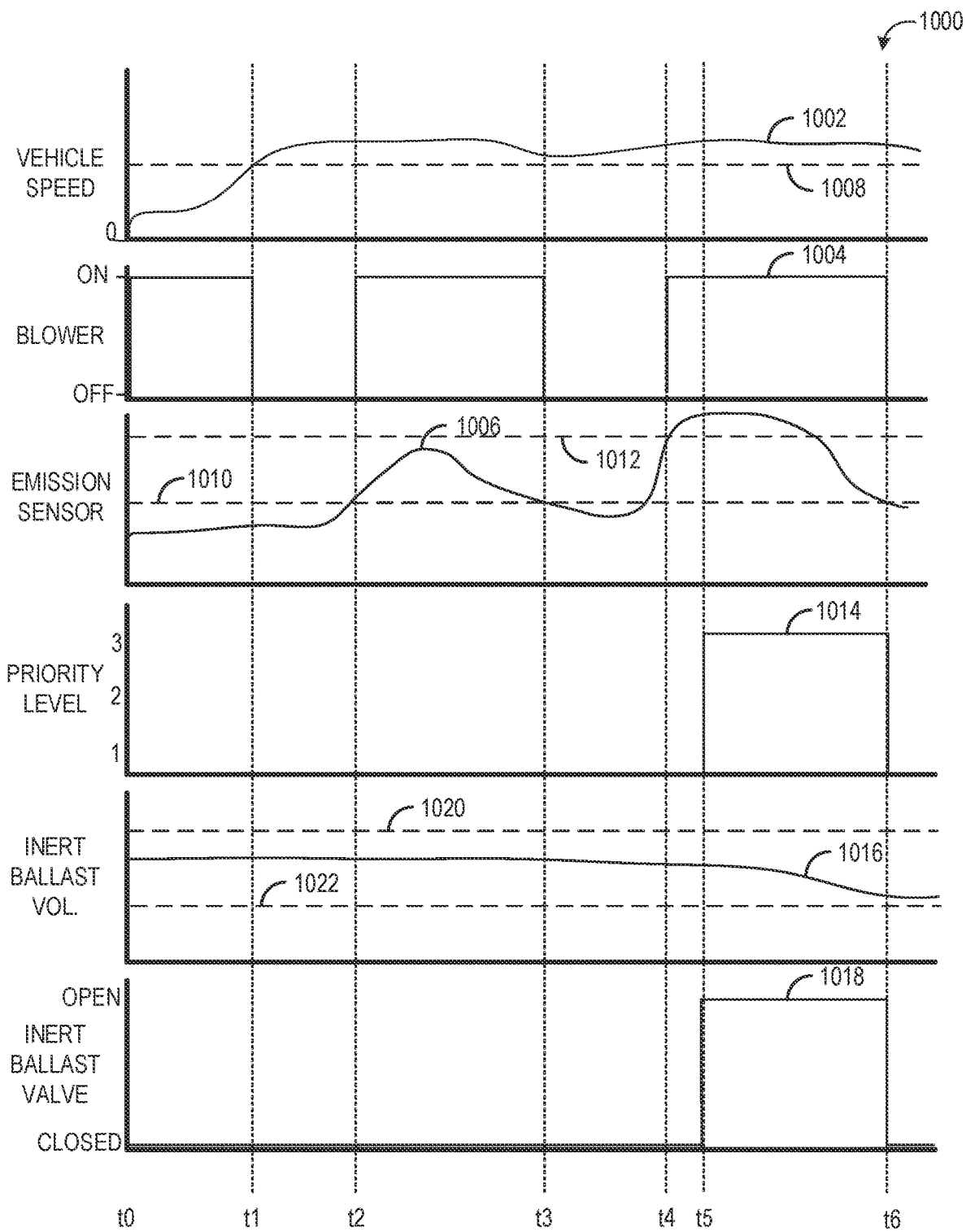
FIG. 10 shows a timing diagram of a prophetic example use of the methods of FIG. 6 and FIG. 8.
Figure 11:
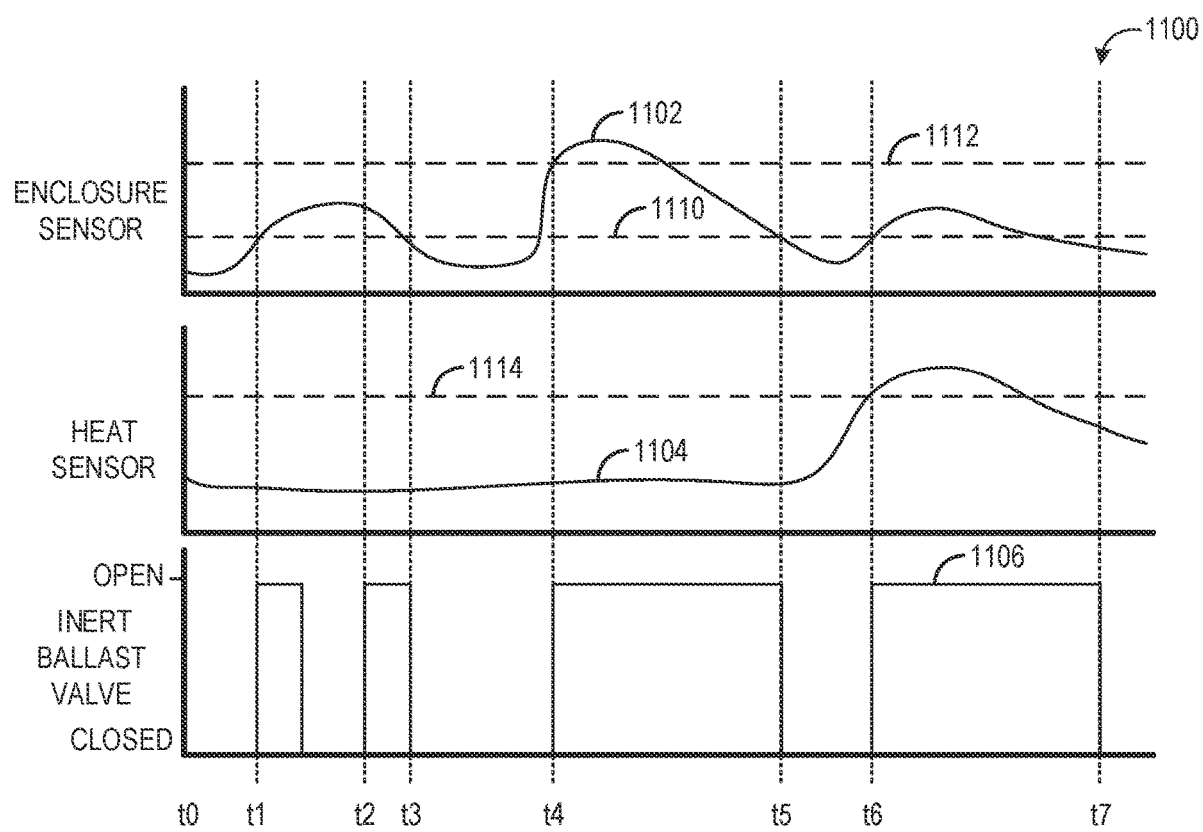
FIG. 11 shows a timing diagram of a prophetic example use of the method of FIG. 7.

FIG. 1 shows an embodiment of a system in which a method for managing a fuel system of a vehicle may be used. The vehicle may be part of a vehicle group, such a consist. An example vehicle of a consist adapted with an internal combustion engine, fuel cell, and a plurality of fuel reservoirs is illustrated in FIG. 2 and a fuel tender that may store one or more fuels combusted by the engine is shown in FIG. 3. An example fuel reservoir for fuel system control is described in FIG. 4. An example method for managing a fuel system of a vehicle including a pump is shown in FIG. 5. An additional or alternative method for managing a fuel system of a vehicle including a blower is shown in FIG. 6. A method for managing a fuel system of a vehicle including an inert ballast reservoir is shown in FIG. 7. A method for prioritizing use of an inert ballast reservoir as part of a strategy to manage a fuel system that may be used in conjunction one or more additional methods for managing a fuel system, such as with FIG. 5 and/or FIG. 6, is shown in FIG. 8. FIGS. 9-11 show timing diagrams illustrating methods 500, 600, 700, and 800 for managing a fuel system of a vehicle.

The approach described herein may be employed in a variety of vehicle types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, and other off-highway vehicles (OHV). On-road vehicles can include automobiles, buses, and semi-trucks. Off road vehicles can include mining equipment, marine vessels, rail vehicles, agricultural vehicles, and the like. For clarity of illustration, a locomotive is provided as an example of a mobile platform supporting a system incorporating an embodiment of the invention.

Before further discussion of the methods for managing a fuel system of a vehicle, an example platform in which the methods may be implemented is shown. FIG. 1 depicts an example train 100, including a plurality of rail vehicles 102, 104, 106, a fuel tender 160, and cars 108, that can run on a track 114. The plurality of rail vehicles, the fuel tender, and the cars are coupled to each other through couplers 112. In one example, the plurality of rail vehicles may be locomotives, including a lead locomotive and one or more remote locomotives. The first rail vehicle may be the lead locomotive. The second rail vehicle and third rail vehicle may be remote locomotives. While the depicted example shows three locomotives and four cars, any appropriate number of locomotives and cars may be included in the train. Further, the locomotives in the train may form a consist. For example, in the embodiment depicted, the locomotives may form a consist 101. Various vehicles may form vehicle groups (such as consists, convoys, swarms, fleets, platoons, and the like). The vehicles in a group may be grouped mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by an engine 10 while the cars may be unpowered. In one example, the engine may be a multi-fuel engine. For example, the engine may combust gaseous and/or liquid fuels with different amounts of carbon, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel.

The train may include a control system. The control system may include at least one engine controller 12, and it may include at least one consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive.

The train may include at least one fuel tender, which may carry one or more fuel storage reservoirs 162 and includes a controller 164. While the fuel tender is positioned in front of the second remote rail vehicle, other examples may include alternate locations of the fuel tender along the train. For example, the fuel tender may be instead positioned behind the first remote rail vehicle or between the lead rail vehicle and the first remote rail vehicle, or behind the second remote rail vehicle.

In one example, the fuel tender may be un-powered, e.g., without an engine or electric traction motors (e.g., electric traction motors 124 shown in FIG. 2). However, in other examples, the fuel tender may be powered for propulsion. For example, as shown in FIG. 2, the fuel tender may include an engine 302. The engine of the fuel tender may combust the fuel stored in the fuel storage reservoir and/or fuel stored at another vehicle of the train.

The fuel storage reservoir may have a suitable structure for storing a specific type of fuel. In one example, the fuel storage reservoir may be adapted for cryogenic storage of liquefied natural gas (LNG) or liquefied hydrogen. As another example, the fuel storage reservoir may be used to store a fuel in a liquid state at ambient temperature and pressure, such as diesel or ammonia. In yet another example, the fuel storage reservoir may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, fuel may be stored both at the fuel tender and at one or more of the locomotives, e.g., as shown in FIG. 2. In addition, in some instances, the fuel tender may store a fuel cell system, including a fuel cell and one or more tanks of compressed hydrogen gas. Alternatively, the fuel cell system may be stored at one or more of the locomotives, as shown in FIG. 2.

FIG. 2 depicts an example embodiment of a locomotive as part of a train that can run on the track 114 via a plurality of wheels 116. Power for propulsion of the locomotive may supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage and out of an exhaust stack (not shown) of the locomotive.

In one embodiment, the engine operates as a compression ignition engine. In another embodiment, the engine operates as a spark ignition engine. The engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual-fuel engine. As depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender of FIG. 1. Alternatively, at least one additional fuel, e.g., a third fuel, may be stored at the fuel tender in addition to the first fuel at the first fuel reservoir and the second fuel at the second fuel reservoir of the locomotive. The first fuel reservoir may be surrounded by a first reservoir enclosure 135. Likewise, the second fuel reservoir may be surrounded by a second reservoir enclosure 137. By enclosing, at least partially, fuel storage, the fuel reservoir enclosures may contain potential emission and reduce migration to an unintended region of the rail vehicle. The fuel reservoir enclosures may also a reduce emission migration as part of the fuel systems detailed in FIGS. 3-4.

In one example, fuels that may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the fuels may be non-hydrocarbon-emitting fuels, such as hydrogen, ammonia, water, etc. Additionally or alternatively, the types of fuel may include hydrocarbon-based fuels, such as diesel, natural gas, methanol, ethanol, other alcohols, dimethyl ether (DME), other ethers, biodiesel, HDRD, syn-gas, etc. The fuels listed above are non-limiting examples of fuels that may be combusted at the engine and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

When configured as a spark ignition or compression ignition multi-fuel engine, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution rate may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and a combustibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. The fuel system described herein may contain emission and mitigate possible emission migration for a variety of fuels and fuel combinations.

The engine is coupled to an electric power generation system, which includes an alternator/generator 122 and electric traction motors 124. For example, the engine generates a torque output that is transmitted to the alternator/generator, which is mechanically coupled to the engine. The alternator/generator produces electrical power that may be stored and applied for subsequent propagation to a variety of downstream electrical components. As an example, the alternator/generator may be electrically coupled to the electric traction motors, and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may have one or more turbochargers 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The locomotive may include an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, also known as particulate matter (an example of which is soot), produced during combustion, and may be ceramic, silicon carbide, or a suitable material. In other embodiments, the exhaust gas treatment system may additionally include a selective catalytic reduction (SCR) catalyst, three-way catalyst, NO trap, various other emission control devices, or combinations thereof. In some embodiments, the exhaust gas treatment system may be positioned upstream of the turbocharger, while in other embodiments, the exhaust gas treatment system may be positioned downstream of the turbocharger.

In some examples, as shown in FIG. 2, the electric traction motors may additionally receive electrical energy from a fuel cell power module 150. The fuel cell power module may include a fuel cell stack that receives hydrogen from one of the fuel reservoirs. The fuel cell power module may receive the second fuel from the second fuel reservoir when the second fuel is hydrogen. In other examples, the fuel cell power module may instead receive fuel from the first fuel reservoir or from the one or more fuel reservoirs of the fuel tender (e.g., of FIG. 3).

Electrical energy generated by the fuel cell power module may be transmitted to a traction inverter 152, which may convert the electrical energy into a suitable for use, by the electric traction motors. For example, the traction inverter 152 may enable direct current (DC) power to alternating current (AC) power conversion. The traction inverter 152 may be electrically coupled to other electrical components of the locomotive that are not shown in FIG. 2 for brevity. For example, the traction inverter 152 may convert electrical electricity delivered to and from an electrical storage device, such as a battery.

The fuel cell power module may be surrounded by a fuel cell enclosure 154. The engine 10 may also be surrounded by an engine enclosure 156. Similar to the first and second fuel reservoir enclosures, by enclosing, at least partially, the fuel cell and engine, the fuel cell and engine enclosures contain potential emission and reduce emission migration to other regions of the rail vehicle. The fuel cell enclosure and engine enclosure may also reduce emission migration as a part of fuel systems detailed in FIGS. 3-4.

To adjust an air ratio of an emission within an enclosure of an at least partially enclosed gaseous fuel deliver, storage, and/or consumption element, e.g., surrounding the first fuel reservoir, the second fuel reservoir, the engine, and/or the fuel cell, some embodiments may utilize a reservoir of inert ballast as a displacement gas. In one embodiment, the inert ballast may be reservoir of inert gas 178. For some fuels, such as natural gas, the inert gas may be recycled exhaust from the engine or another exhaust generator. One such exhaust may be CO2. Additionally or alternatively, a self-contained canister of an inert gas, such as halon, may be used. For other fuels, such as hydrogen, the inert gas may be a noble gas, such as argon. In one embodiment, in response to sensed gaseous fuel above a threshold an actuator may be adjusted to provide the displacement gas to the enclosure, thus reducing the air ratio of the emission.

In one embodiment, one or more self-detonating fire extinguishers 191 may be mounted to the interior of the locomotive. In one example, the self-detonating fire extinguisher may activate within 3-5 seconds of the fire extinguisher being exposed to a fire flame. In one example, self-detonating fire extinguisher activation may include a benign explosion dispersing a fire-extinguishing dry chemical fire suppressant such as monoammonium phosphate. Self-detonating fire extinguishers may be placed near and/or inside any component of the vehicle that may have a high priority level (e.g., flammable, near personnel). In the example locomotive, the self-detonating fire extinguisher is shown adjacent the enclosures containing the fuel cell and the second fuel reservoir. A plurality of self-detonating fire extinguishers may be mounted to and/or placed within one or more additional or alternative enclosures of the locomotive and/or mounted to and/or placed within other vehicles of the consist such as a fuel tender.

In some examples, the engine and the battery may be included in a hybrid engine system where the electric traction motors may be powered by both the engine and the battery. The battery may be used to both energize the electric traction motors and to store energy captured during, for example, regenerative braking operations, such as dynamic braking. In yet other examples, the hybrid engine system may also include the fuel cell power module, and power for vehicle propulsion may be provided by each of the engine, the battery, and the fuel cell power module individually or in various combinations. For example, the hybrid engine system may be operated in an engine-only mode, a battery-only mode, a fuel cell-only mode, or obtain power from a power-split operation mode including combined power delivery from the engine and battery, from the engine and fuel cell, etc.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and the consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 151, as further elaborated herein, in order to determine operating parameters and operating conditions, and correspondingly adjust various engine actuators 153 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. In one example, one or more of a plurality of sensors may be coupled to the one or more enclosures of the fuel system. Sensors coupled to enclosures may include sensors for detecting a concentration of one or more gaseous fuels (herein referred to as an emission sensor) and/or pressure of one or more gaseous fuels. For example, the first fuel reservoir enclosure may include one or more sensors 189, the second fuel reservoir enclosure may include one or more sensors 188, the engine enclosure may include one or more sensors 186, and/or the fuel cell enclosure may include one or more sensors 190. The control signal portion may generate control signals to trigger various locomotive actuators. Example locomotive actuators may include air brakes, brake air compressor, traction motors, etc. Other actuators may be coupled to various locations in the locomotive. Other examples may include one or more actuators for controlling components of the fuel system, e.g., inert gas reservoir, vacuum pump, blower. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller. In one embodiment, enclosure sensors may detect hydrogen and the controller may monitor enclosures and other regions of the vehicle a ratio of hydrogen gas to oxygen. In response to a sensor indication of hydrogen greater than a threshold ratio in an unintended region, the consist controller may adjust one of the actuators for controlling components of the fuel system, e.g., inert gas reservoir, vacuum pump, blower such as described in FIGS. 5-8.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment of the fuel tender of FIG. 1 is shown. As described above, the fuel tender includes fuel storage reservoir 162, controller 164, and an engine 302. The fuel tender may further include a first unit 304, which may be a device for controlling a temperature and pressure within the fuel storage reservoir. For example, when liquefied hydrogen or LNG is stored in the fuel storage reservoir, the first unit may be a cryogenic unit. The fuel storage reservoir sizes and configurations may be selected based on end use parameters, may be removable from the fuel tender, and may be receive fuel from an external refueling station via port 306.

The fuel storage reservoir may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage reservoir to the locomotive engines and the engine of the fuel tender, the fuel may be combusted by the engines distributed across the train. In a non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a speed sensor 319, a pressure sensor 320, a temperature sensor 322, an emission sensor 323, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

The speed sensor may measure the RPM of the plurality of wheels and may estimate the velocity of the train. The pressure sensor may measure the pressure within a fuel reservoir and/or a fuel reservoir enclosure. The temperature sensor may measure the temperature and/or temperature change from a within a fuel reservoir and/or a fuel reservoir enclosure. The emission sensor may measure the concentration of an emission (e.g., a gaseous fuel) relative to air in a fuel reservoir enclosure.

In one example the power conversion unit includes an alternator (not shown) that is connected in series to one or more rectifiers (not shown) that convert an AC electrical output of the alternator to a DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage reservoir, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives. In one example, the controller may close a sealing valve 358, e.g., in response to an indication from a sensor of the fuel system. Closing the sealing valve may reduce emission migration between the fuel reservoir and other locations of the vehicle, e.g., to fuel delivery lines, the fuel tender, locomotives, other cars, the engine, and/or fuel cell.

As shown in FIG. 3, an enclosure 362 may enclose (e.g., contain, surround), at least partially, the fuel storage reservoir in the fuel tender. The enclosure may isolate potential emission and reduce emission migration into unintended regions of the vehicle. The fuel storage reservoir enclosure may reduce emission accumulation using one or more of emission control devices. The following embodiments for a fuel system may be used may be used in independently of and/or in combinations with one another.

To mitigate emission in the fuel storage reservoir, some embodiments may maintain the fuel storage reservoir enclosure at a negative pressure relative to an exterior environment (e.g., ambient) of fuel tender, rail vehicles, the locomotives, and cars. Negative pressure may be achieved with an eductor 348 (e.g., eductor tube, Venturi tube) and/or vacuum pump 345. As an example, one or more of a plurality of eductors and/or vacuum pumps may couple the enclosure of the fuel storage reservoir interior to the ambient via an outlet in exterior of the vehicle.

With the fuel tender and consist at sufficient speed, the one or more eductors may reduce and/or maintain the reservoir enclosure at a negative pressure relative to the exterior environment drawing fresh air into the enclosure. For example, flow to the eductor may be generated by vehicle motion such that air flow moving past the eductor may act as a motive fluid entering high enough velocity to reduce the pressure of the enclosure relative to the exterior environment.

While the fuel tender and consist are not in motion or moving slower than a threshold speed, one or more strategies may be utilized to draw fresh air through the enclosure. As one example, an actuator may be adjusted to flow exhaust gas from an engine or fuel cell air past the eductor when the vehicle is not in motion. As another example, a vacuum pump may be used to maintain fresh air flow through the enclosure. For example, pressure in excess of a threshold in the enclosure may determine operation of the vacuum pump. In an additional or alternative embodiment, greater than threshold emission may determine vacuum pump operation.

In other embodiments, a fuel system may utilize venting (e.g., circulation) of external air 351 through a fuel reservoir enclosure. The venting of external air may be achieved for such embodiments using one or more eductors and/or another outlet vent, such as an intake vent 350, and a blower 352. In some examples, there may be one or a plurality of intake vents and blowers.

In one example, an intake vent may be placed on the front, sides, top, and/or bottom of the fuel tender. When the fuel tender and consist are in motion, a quantity of air may enter through the inlet vent and circulate through the fuel storage reservoir enclosure. The outside air circulating in the fuel storage reservoir enclosure may leave through an outlet such as an eductor or outlet vent. At slower than threshold speed, the blower may pull and circulate external air from the inlet vent through the enclosure.

Some embodiments of a fuel tender may include a reservoir of inert ballast such as inert gas 354. In one example, inert gas may be released through an inert gas valve 356 into the fuel storage reservoir enclosure. In one embodiment, inert gas may be released through the inert gas valve into the enclosure to adjust an air ratio of an emission, such as a ratio of hydrogen gas and oxygen. Example inert ballasts gas may include recycled exhaust from the engine or another exhaust generator, a self-contained canister of an inert gas, such as halon may be used, or a noble gas, such as argon. In other examples, a reservoir may include a liquid and/or solid inert ballast.

In an example, inert gas may be released into the enclosure if greater than threshold pressure is sensed by the pressure sensor. In another example, a sensor detecting a pressure drop of a gaseous fuel may initiate the release of inert gas. Additionally or alternatively, inert gas may be released into the enclosure if emission greater than a threshold is detected by the emission sensor. As another example, inert gas may be released into the enclosure if the temperature increases above a threshold detected by the temperature sensor.

The fuel tender depicted in FIG. 3 is a non-limiting example a fuel tender configuration. In other examples, the fuel tender may include additional or alternative components. As an example, the fuel tender may further include additional sensors, flow meters, control valves, various other devices, and mechanisms for controlling fuel delivery and storage.

Figure 4:
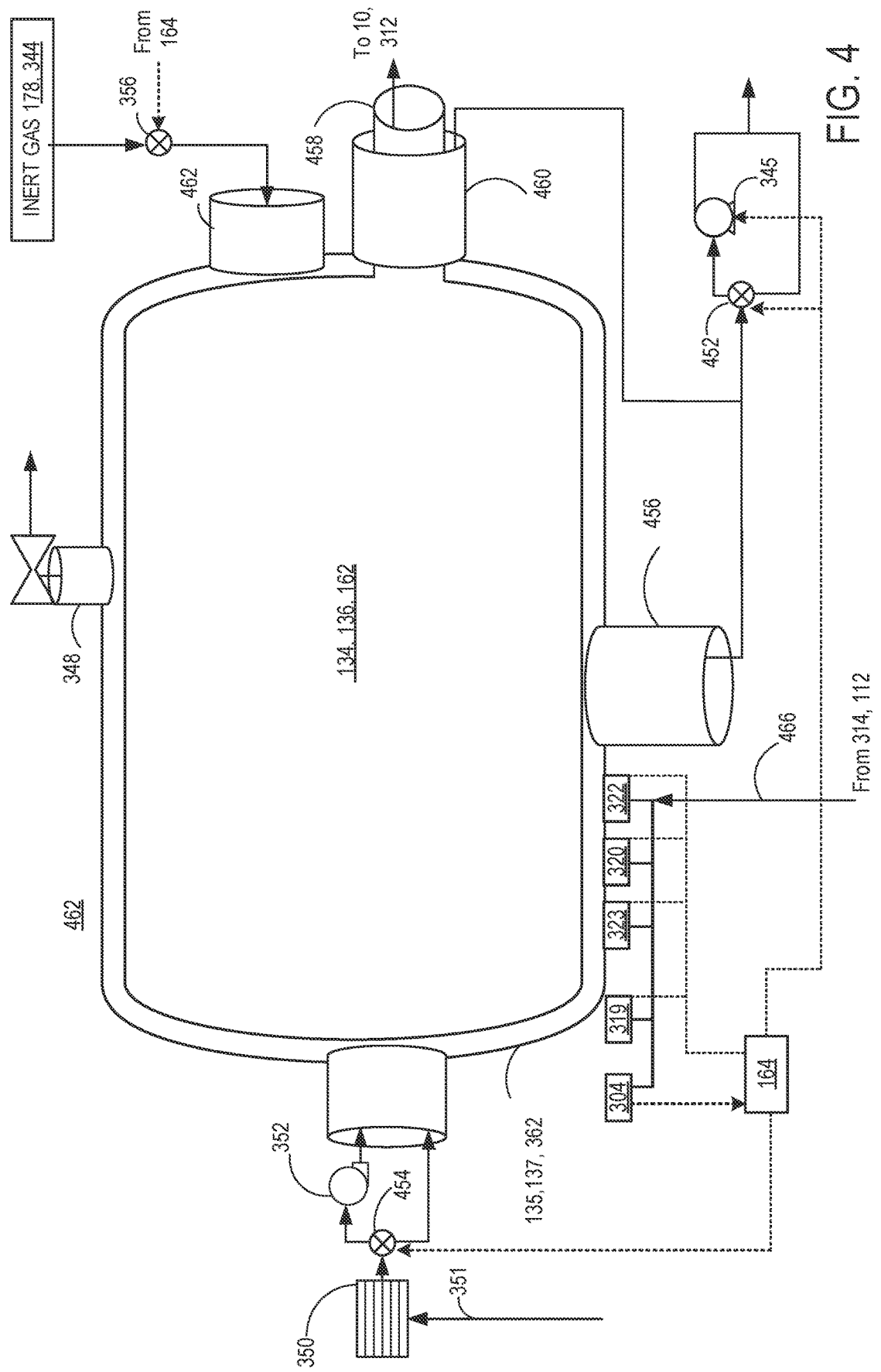
FIG. 4 shows a schematic diagram of an example embodiment of an enclosure for a fuel system.

Turning now to FIG. 4, shows a detailed view of an enclosure for a fuel storage reservoir in a fuel system. As described above with respect to FIG. 2 and FIG. 3, the fuel system may contain and mitigate possible emission migration into and/or out from an enclosure for a fuel reservoir, fuel cell, and/or engine. Various aspects of the system may be used in independently of and/or in combinations with one another.

FIG. 4 shows vacuum pump valve 452 and blower valve 454. In some embodiments, a pump valve may be used to control the flow of low pressure air from an enclosure to a vacuum pump. In other embodiments, the blower valve may be direct external air through the blower or directly into a reservoir enclosure.

FIG. 4 shows a plurality lines coupling the fuel reservoir and/or the enclosure. One embodiment may include an enclosure relief line 456. In one example, the enclosure relieve line may couple to the vacuum pump via the pump valve. One embodiment may include one or more fuel lines 458. The fuel line transports fuel away from the reservoir to an engine or fuel modification unit. One or more fuel lines may send fuel from the first fuel reservoir, the second fuel reservoir, or other fuel storage reservoir to an engine or a fuel cell, such as shown in FIG. 2. In one embodiment, a fuel line enclosure 460 may fully enclose and create a seal around the fuel line. In one embodiment, the fuel line enclosure is continuous with the enclosure. As an example, a sensor detecting a change in the environment of the enclosure (e.g., pressure, emission, heat) may include in the fuel line enclosure.

In some embodiments, inert gas may be delivered to the enclosure, e.g., including the fuel line enclosure, through one or more delivery lines 462. The system may include one or more delivery lines to an enclosed element, such as a reservoir, a fuel cell power model, or engine. The inert gas valve may control the flow of inert gas to one or more delivery lines.

The sensors, including the speed sensor, the pressure sensor, the temperature sensor, and the emission sensor depicted in FIG. 4, may be powered by a battery and/or power conversion unit depicted in FIG. 3. Power 466 delivered to the sensors is depicted in FIG. 4 as an arrow. Based on sensor signals, the controller may adjust conditions and/or settings of the fuel system. In some embodiments, the controller may adjust the vacuum pump and/or vacuum pump valve. In other embodiments, the controller may adjust the blower and/or blower valve. In other embodiments, the controller may adjust the inert gas valve.

In one embodiment, the inert gas valve may release inert gas into the enclosure as a single operation or as a repeated operation.

In a single operation (e.g., one-time event discharge), a larger quantity, a majority, or all of the inert gas may be released through the gas release valve into an enclosure. However, discharge of inert gas may vary depending on the volume of the enclosure and inert gas stored. Inert gas that may be regenerated over a period of time, e.g., exhaust gas, may be used with greater frequency, in some examples. Inert gas that may not be regenerated, e.g., halon, argon, may be used less frequently. Additionally, a single event discharge may choke or temporarily stop fuel consumers, such as an engine or a fuel cell power module, or degrade gaseous fuel if delivered directly into a body. In one embodiment, a first single operation may flood an enclosure in response to a first higher level of sensed emission in the unintended region.

In a repeated operation (e.g., plural event discharge), smaller and/or smaller, repeated, quantities of inert gas may be expended through the inert gas valve. Repeated operation may include pulse purges, where small quantities of inert gas are periodically discharged through the enclosure. Pulse purges may flush emission from an enclosure similar to external air circulated by the blower or the negative pressure generated by the vacuum pump and/or eductor. Repeated operations may include action related to possible emission events and/or relatively minor pressure and/or temperature variation within an enclosure. Repeated operations may be delivered through the inert gas delivery line to the enclosure and/or to the enclosed components, e.g., reservoir interior, engine, fuel cell, etc. Repeated operations may be governed by the controller opening and closing the inert gas valve for brief periods in succession. Other repeated operations may be governed by the controller opening the opening the inert gas valve for a brief period, closing, and waiting for new sensor signals. In one embodiment, a repeated operation may provide a limited flow of inert gas to an enclosure in response to a second lower level of sensed gaseous fuel in the unintended region.

In some embodiments, the pump valve may be designed to fail open. The pump valve may be designed to fail open so that if a significant amount of gaseous fuel into an enclosure occurs, fuel emissions may not be enclosed and accumulate. Should a significant amount of emissions accumulate in a reservoir or enclosure attached to a vacuum pump, the vacuum pump may be directed to operate and maintain or reduce the pressure of the reservoir and/or the fuel enclosure relief line relative to the exterior. For one embodiment should a vacuum pump fail, the pump may fail open to the eductor and fail close to the vacuum pump. Failing close to the vacuum pump may prevent accumulation within the vacuum pump and/or prevent fuel emissions from reacting due to a spark.

In some embodiments, the blower valve may be designed to fail open. The blower valve may be designed to fail open so that if a significant accumulation of fuel emissions into the enclosure occurs, the fuel emissions may not be enclosed and accumulate. Should failure occur in a reservoir or enclosure attached to a vacuum pump, the blower may be directed to operate and maintain or increase the flow of exterior air into the reservoir and/or the fuel enclosure relief line. For one embodiment should a blower fail, the pump may fail open to the enclosure and fail closed to the blower. In some embodiments the inert gas valve, may be designed to fail open to the enclosure. The inert gas valve may be designed to fail open if a significant amount of fuel emission accumulation in the enclosure occurs. The inert gas valve may be designed to fail open in an event involving substantial temperature or pressure change detected in a fuel reservoir or a fuel reservoir enclosure.

In some embodiments, the controller may adjust the vacuum pump via signals from the speed sensor, pressure sensor, and/or emission sensor. In some embodiments, the controller may adjust blower via signals from the speed sensor, pressure sensor, and/or emission sensor. In other embodiments, the controller may actuate the blower valve open or closed. In other embodiments the controller may be used and control the release of inert gas into the fuel reservoir enclosure through the inert gas valve.

In another example in another embodiment, the speed sensor may detect the train speed. Once a threshold speed is reached, the blower may not be needed to generate continuous airflow through the enclosure such as a fuel reservoir enclosure. The controller may actuate the blower valve to a channel directly between the intake vent and the reservoir enclosure. The controller may slow and eventually stop the blower. The controller may then actuate the blower valve to close a channel between the intake vent and the blower once the blower has ceased function An example of a method 500 for managing a fuel system is shown in FIG. 5. As an example, the method may be executed by a controller of a vehicle system including a fuel system with a vacuum pump. The fuel system with a vacuum pump may include one more enclosures containing one or more of a fuel reservoir, fuel cell, combustion engine, and/or lines for delivering fuel. In an exemplary embodiment, the method may maintain a negative air pressure of the enclosure below a threshold air pressure and/or mitigate migration of potential emissions. Instructions for carrying out the method may be executed by a controller having a plurality of processors based on instructions stored on a memory of the controller and in conjunction with signals received from sensors of the vehicle system, such as the sensors described above with reference to FIGS. 2-4. The controller may employ actuators of the vehicle system to adjust fuel system operation, according to the methods described below. The method may be an additional or alternative method to other methods described herein.

At step 502, the method includes estimating and/or measuring operating conditions. For example, operating conditions may include conditions of the one or more enclosures of the fuel system, such as air pressure, air temperature, a presence of one or more emissions, an air ratio of one or more emissions, etc. Operating conditions may include vehicle-operating conditions such as a vehicle speed, engine load, power output, etc. Ambient conditions affecting vehicle operation, such as barometric pressure, ambient temperature, and humidity, may be monitored and other parameters such as volume and pressure at storage tanks (e.g., fuel, inert ballast) may be confirmed. The operating conditions may be measured by one or more sensors communicatively coupled to the controller (e.g., air pressure sensor, temperature sensor, emission sensor, Hydrogen gas [$H_2$] sensor, tank pressure sensor, tank volume sensor) or may be inferred based on available data.

At step 504, the method includes determining if a measurement of a sensor of an enclosure of the fuel system is greater than a first threshold. The first threshold may be a preset, non-zero threshold. In one example, the sensor may be an air pressure sensor and the first threshold may be a first threshold air pressure. The air pressure may be determined by the controller based on operating conditions. For example, the enclosure may include one or more of a plurality of sensors for detecting air pressure. Air pressure greater than a first threshold pressure may be indicated by any one of a plurality of pressure sensors. Additionally or alternatively, one or more sensors may include an emission sensor. For example, an emission sensor may detect a concentration or air ratio of a gaseous fuel such as hydrogen. In such an example, the first threshold may be a first threshold air ratio, e.g., a ratio of hydrogen gas and oxygen. The enclosure may include one or more of a plurality of sensors for detecting emission. Emission greater than the first threshold emission may be indicated by any one of the emission sensors. If an enclosure sensor greater than a first threshold is not indicated (e.g., air pressure is negative, emission is low), the method continues to step 506.

At step 506, the method includes continuing to operate under current conditions. In one example, current conditions may include the vacuum pump in an off state.

If an enclosure sensor greater than a first threshold is indicated, the method continues to step 508. At step 508, the method includes determining if an enclosure sensor greater than a second threshold is indicated. The second threshold may be a preset, non-zero threshold. In one example, the sensor may be a pressure sensor and the second threshold may be a second threshold air pressure, e.g., higher than the first threshold pressure. The air pressure may be determined by the controller based on operating conditions. Air pressure greater than a second threshold pressure may be indicated by any one of the pressure sensors. Additionally or alternatively, the sensor may be an emission sensor e.g., for detecting an air ratio of an emission, and the second threshold may be a second threshold ratio, e.g., higher than the first threshold ratio. As an example, emission greater than the second threshold emission may be indicated by any one of the plurality of emission sensors. If a measurement of an enclosure sensor greater than a second threshold is not indicated, the method continues to step 510.

At step 510, the method turns on the vacuum pump for a first threshold duration. In one example, the first threshold duration may be a preset non-zero threshold duration. In one example, the first threshold duration may be a duration of time. The first threshold time may be calibrated based on a size of the enclosure and an average estimate time to evacuate the air from the enclosure. The method continues to step 504 to determine whether one or more enclosure sensors greater than the first threshold is indicated once more. If an enclosure sensor greater than the first threshold is not indicated (e.g., air pressure or emission falls below the threshold), the method continues to step 506 where current operating conditions may be continued.

Returning to step 508, if an enclosure sensor greater than a second threshold is indicated, the method continues to step 512. At step 512, the method includes turning on the vacuum pump for a second threshold duration. In one example, the second threshold duration may be a preset non-zero threshold duration. In one example, the second threshold duration may be a second, longer, duration of time. The method continues to step 514.

At step 514, the method includes applying a strategy for emission control. As an example, the emission control strategy may include running the vacuum pump continuously. An additional or alternative strategy may include closing a shut-off valve to each of the one or more fuel reservoirs (e.g., tanks) stored in the enclosure or/and stored in a region of the vehicle or/and a region of the consist. In another example, the emission control strategy may include pumping a supply of inert gas (e.g., argon, spent exhaust gas) into the enclosure. In one example, an alert may be generated in response to the indication of greater than threshold emission and/or pressure. For example, the alert may be displayed to a vehicle operator and may include indication of the sensed emission and control strategy. As a further example, the emission control strategy may include continuing to FIG. 8, where an emission control method is described.

An example of a method 600 for operating a fuel system is shown in FIG. 6. As an example, the method 600 may be executed by a controller of a vehicle system including a fuel system with a blower. The fuel system may include one more enclosures containing one or more of a fuel reservoir, fuel cell, combustion engine, and/or pipes for carrying fuel. The fuel system may include a vent through which fresh air is drawn into the enclosure and exhausted, thereby passively circulating fresh air through the enclosure. The method may maintain the flow of fresh air circulating through the enclosure by adjusting the blower based on vehicle speed and/or mitigate migration of potential emissions by adjusting the blower based on emission detection. The method 600 may be an additional or alternative method to other methods described herein.

At step 602, the method includes estimating and/or measuring operating conditions. For example, operating conditions may include vehicle operating conditions such as a vehicle speed, engine load, power output, etc. Operating conditions may include conditions of the one or more enclosures of the fuel system, such as amount of one or more emissions, an air ratio of one or more emissions, air temperature, air pressure, etc. Ambient conditions affecting vehicle operation, such as barometric pressure, ambient temperature, and humidity, may be monitored and other parameters such as a volume and pressure at storage tanks (e.g., fuel, inert ballast) may be confirmed. The operating conditions may be measured by one or more sensors communicatively coupled to the controller (e.g., air pressure sensor, temperature sensor, emission sensor, air ratio sensor, Hydrogen gas [$H_2$] sensor, tank pressure sensor, tank volume sensor) or may be inferred based on available data.

At step 604, the method includes determining if vehicle speed greater than a threshold speed is indicated. The vehicle speed may be determined by the controller based on operating conditions. For example, the vehicle may include one or more of a plurality of wheel sensors for estimating vehicle speed. The threshold speed may be a preset, non-zero threshold. In one embodiment, the threshold speed may be based on an estimate speed to draw air flow through the enclosure at a preset rate. If vehicle speed greater than a threshold speed is indicated (e.g., speed is moderate or high), the method continues to step 606.

At step 606, the method includes determining if emission greater than a first threshold emission is indicated. The first threshold emission may be a preset, non-zero threshold. In one example, the sensor may be a sensor for detecting a gaseous fuel, and the first threshold may be a first threshold parts per million (PPM). As another example, the sensor may be an emission sensor. For example, an emission sensor may detect a concentration or air ratio of a gaseous fuel such as hydrogen. In such an example, the first threshold may be a first threshold air ratio, e.g., a ratio of hydrogen gas and oxygen. For example, the enclosure may include one or more of a plurality of sensors for detecting the emission. Emission greater than the first threshold emission may be indicated by any one of the emission sensors. If emission greater than the first threshold emission is not indicated (e.g., emission is low), the method continues to step 608.

At step 608, the method includes continuing to operate under current conditions. In one example, current conditions may include not operating the blower.

Returning to step 604, if vehicle speed less than the threshold speed is indicated, the method continues to step 610. At step 610, the method includes operating the blower. With the blower on, fresh air is drawn into the enclosure. In one example, the blower may circulate fresh air through the enclosure faster than the passive draw through the vent (e.g., irrespective of vehicle speed).

To determine a duration of blower operation the method continues to step 612. At step 612, the method includes determining if vehicle speed greater than the threshold speed is indicated. If vehicle speed greater than the threshold speed is not indicated, blower operation may continue. If vehicle speed greater than the threshold speed is indicated, the method continues to step 614.

At step 614, the method includes determining if emission greater than the first threshold emission is indicated. In one example, the first threshold emission may be the same first threshold emission described with respect to step 606. If one or more emission sensors do not indicate emission greater than the first threshold (e.g., emission is low), the method continues to step 616. At step 616, the blower may be shut off. The method returns.

If emission greater than the first threshold is indicated, the method continues to step 618. At step 618, the method includes determining if emission greater than a second threshold emission is indicated. As an example, the second threshold emission may be a preset non-zero threshold. In one example, the second threshold emission may be a second air ratio (e.g., $H_2$ to $O_2$) and the second threshold may be a second threshold ratio. If emission greater than the second threshold emission is not indicated, the method continues to step 620 where blower operation may be maintained. With blower operation maintained, the method returns to step 612.

Returning to step 618, if emission greater than the second threshold emission is indicated, the method continues to step 624. At step 624, the method includes applying a strategy for emission control. As one example, the emission control strategy may include running the blower continuously and/or until turned off by an operator. An additional or alternative strategy may include closing a shut-off valve to each of the one or more fuel reservoirs (e.g., tanks) stored in the enclosure or/and stored in a region of the vehicle or/and a region of the consist. In an example, the emission control strategy may include pumping a supply of inert gas (e.g., argon, spent exhaust gas) into the enclosure. As another example, the emission control strategy may include continuing to FIG. 8, where an emission control method is described.

Returning to step 606, if emission greater than the first threshold is indicated (e.g., while vehicle speed greater than the threshold is indicated), the method continues to step 610. With the blower on at step 610, the method continues to step 612, as described above. In this way, vehicle speed below the threshold speed or emission greater than the first threshold emission may indicate blower operation. Blower operation may be maintained until speed and emission thresholds indicate blower operation may stop.

An example of a method 700 for operating a fuel system is shown in FIG. 7. As one example, the method may be executed by a controller of a vehicle system including a fuel system with a reservoir (e.g., one or more tanks) of an inert ballast (e.g., argon, halon, oxygen-depleted exhaust). The fuel system with inert ballast reservoir may include one more enclosures containing one or more of a fuel reservoir, fuel cell, combustion engine, and/or pipes for carrying fuel. In an exemplary embodiment, the method may direct an amount of inert ballast into an enclosure of the fuel system upon detection of greater than threshold emission. As an example, the supply of inert ballast to the enclosure may reduce an air ratio of a first emission to one or more second emissions (e.g., a first gas to a second gas, $H_2$ to $O_2$). The method may be an additional or alternative method to other methods described herein.

At step 702, the method includes estimating and/or measuring operating conditions. For example, operating conditions may include conditions of the one or more enclosures of the fuel system, such as air pressure, air temperature, an air ratio of one or more emissions, etc. Operating conditions may include vehicle operating conditions such as a vehicle speed, engine load, power output, etc. Ambient conditions affecting vehicle operation, such as barometric pressure, ambient temperature, and humidity, may be monitored and other parameters such as volume and pressure at storage tanks (e.g., fuel, inert ballast) may be confirmed. The operating conditions may be measured by one or more sensors communicatively coupled to the controller (e.g., air pressure sensor, temperature sensor, emissions sensor, Hydrogen gas [$H_2$] sensor, tank pressure sensor, tank volume sensor) or may be inferred based on available data.

At step 704, the method includes determining if a sensor signal of the enclosure greater than a first threshold is indicated. The first threshold may be a preset, non-zero threshold. In one example, the sensor may be an emission sensor, e.g., for detecting PPM, and the first threshold may be a first threshold PPM. As another example, the emission sensor may determine an air ratio of an emission, e.g., a percent $H_2$ to $O_2$, and the first threshold may be a first threshold air ratio. For example, the enclosure may include one or more of a plurality of sensors for detecting emission. Emission greater than the first threshold emission may be indicated by any one of the emission sensors. Additionally or alternatively, one or more sensors may include an air pressure sensor and the first threshold may be a first threshold air pressure. The enclosure sensor reading may be determined by the controller based on operating conditions. If an enclosure sensor signal greater than a first threshold is not indicated (e.g., air pressure is low, air ratio is low), the method continues to step 706.

At step 706, the method includes continuing to operate under current conditions.

If a sensor signal greater than a first threshold is indicated, the method continues to step 708. At step 708, the method includes determining if a sensor signal greater than a second threshold is indicated. The second threshold may be a preset, non-zero threshold. In one example, the sensor may be a pressure sensor and the second threshold may be a second threshold air pressure of the enclosure, e.g., higher than the first threshold pressure. The air pressure may be determined by the controller based on operating conditions. Air pressure greater than the second threshold pressure may be indicated by any one of the pressure sensors. In another example, the sensor may be an emission sensor, e.g., for detecting an air ratio of $H_2$, and the second threshold may be a second threshold $H_2$ air ratio, e.g., an air ratio greater than the first threshold air ratio. Emission greater than the second threshold emission may be indicated by any one of the plurality of emission sensors. If a sensor signal greater than the second threshold is not indicated, e.g., pressure or emission sensor is elevated but less than the second threshold, the method continues to step 710.

At step 710, the method includes determining if heat greater than a threshold is indicated. As an example, one or more thermal sensors may detect changes of heat in the enclosure. The threshold may be a preset non-zero threshold. In one example, the heat threshold may be calibrated to a temperature greater than an average temperature of the enclosure. If heat greater than the threshold is not indicated, the method continues to step 712.

At step 712, the method includes opening a valve controlling the flow of the inert ballast reservoir for a first threshold duration. As one example, the reservoir of inert ballast may be spent (e.g., oxygen depleted) exhaust gas. The first threshold duration may be a preset non-zero duration, e.g., of time. The duration of time may be calibrated to a rate of flow of the valve and a desired volume of inert ballast.

From step 712, the method returns to step 704 where the method includes determining if an enclosure sensor signal greater than a first threshold is indicated. If an enclosure sensor signal greater than a first threshold is not indicated, the method continues operating under current conditions and then returns. In this way, a brief purge of inert ballast, followed by a check of the sensor, may evacuate out periodic emissions indicated by changes in the enclosure environment, such as changes in air pressure and/or air ratio. Continued moderate emission detection may determine periodic, repeated pulses of inert ballast released into the enclosure.

If at step 708 an enclosure sensor signal greater than a second threshold is indicated, the method continues to step 714. For example, an air ratio greater than an upper threshold is indicated. If at step 710, heat greater than a threshold is indicated, the method continues to step 714. For example, the temperature of the enclosure rises above an average daytime temperature. In both examples, a high priority event may be indicated and direct to step 714.

At step 714, the method includes opening the valve controlling the flow of the inert ballast reservoir for a second threshold duration. In one example, the second threshold duration may be a preset non-zero threshold duration. In one example, the second threshold duration may be a second, longer, duration of time. A duration of time may be calibrated to a rate of flow of the valve and a desired, e.g., larger, volume of inert ballast. Additionally or alternatively, the valve may be opened for a continuous flow of inert ballast. At step 714, the method may also include an operator or technician diagnosing the sensor indication greater than the second threshold. The method returns.

In one embodiment, a method for an inert ballast reservoir may be used in combination with a fuel system including one or more enclosures modified for passive air circulation. Examples include an enclosure modified with an air vent and exhaust valve and/or eductor tube for circulating air through the enclosure with sufficient ambient airflow. In such an example, the inert ballast reservoir may support the passive airflow modifications by introducing additional strategies to reduce the air ratio of potential emissions, either with smaller pulses of inert ballast or with larger volumes of inert ballast. Additional or alternative ballasts may include solid or liquid inert substances.

An example of a method 800 for managing a fuel system is shown in FIG. 8. The method may be an emission control strategy for mitigating emission migration events based on priority level, for example, by adjusting operation of a device such as a vacuum pump and/or blower, and an inert gas reservoir (e.g., argon, halon, oxygen depleted exhaust). In an exemplary embodiment, the method may partially or wholly substitute step 518 and/or step 624 in the methods described in detail above in FIG. 5 and FIG. 6, respectively. For example, the method may begin following an indication of one or more sensor signals of a greater value, e.g., higher pressure, higher air ratio, than may be managed by a previously (e.g., immediately prior) utilized strategy, e.g., vacuum pump and/or blower evacuation. In on example, the method may be employed in addition or alternatively to other strategies disclosed herein.

The method begins at step 802. At step 802, the method includes determining location and priority level of an enclosure where a greater than threshold sensor signal (e.g., pressure, emission) is indicated. In one example, the location of the enclosure may be used to determine one or more conditions of the inert ballast reservoir, such as type (e.g., oxygen-depleted exhaust, noble gas) and/or volume of the one or more ballast tanks coupled to the enclosure. As an example, enclosure priority levels (e.g., level 1, level 2, and level 3) may be designated based on operating conditions. For example, priority level may be designated based on the location of the enclosure. For example, one or more areas of a vehicle or consist may be prioritized based on proximity to other fuels, combustion sources, vehicle operators and/or passengers. In an additional or alternative embodiment, priority level may be designated based on the type of sensor signal and level. For example, a sensor signal substantially higher than an upper threshold may be determined a higher priority than a relatively lower sensor signal. In another example, a high pressure enclosure may be higher priority than a low pressure enclosure, e.g., due to potential emission migration. In one example, an alert may be generated during the locating and prioritization determination. For example, the alert may be displayed to a vehicle operator and may include information about the location, priority level, and control strategy. The method continues to step 804.

At step 804, the method includes determining if priority level one is indicated for the enclosure. In one example, priority level 1 may be lowest priority. As an example, an enclosure at priority level 1 may be in a relatively isolated location and/or a relatively low pressure enclosure. For example, priority level 1 may include a fuel tender without an engine. In some embodiments, priority level 1 may be omitted. If the enclosure is not priority level 1, the method continues step 808. If the enclosure is priority level 1, the method continues to step 806.

At step 806, the method includes continuous enclosure emission evacuation and diagnosis. For example, continuous enclosure emission evacuation for an enclosure with a vacuum pump may include running the vacuum pump continuously until a designated stop is reached and/or a technician or operator is available to assess the enclosure.

At step 808, the method includes determining if a fill volume of the inert ballast reservoir greater than a first threshold volume is indicated. In one example, the first threshold volume may be a preset non-zero threshold. In one example, the first threshold volume may be calibrated based conditions such as trip duration or enclosure size. In one example, the first threshold may be include a relatively high fill volume of the one or more tanks of the inert ballast reservoir. If a volume of the inert ballast reservoir greater than the first threshold volume is indicated, the method continues to step 810.

At step 810, the method includes determining if priority level greater than level 2 is indicated for the enclosure. In one example, priority level 2 may be a relatively higher priority than level 1 and relatively lesser priority than level 3. As an example, an enclosure at priority level 2 may be in a less isolated location and/or contain materials of relatively greater priority. For example, priority level 2 may include a fuel tender with an engine or electric traction motors. If greater than priority level 2 is indicated, the method continues step 814. If greater than priority level 2 is not indicated, the method continues to step 812.

At step 812, the method includes opening a valve controlling the flow of the inert ballast reservoir for a first threshold duration. A first threshold duration may be a preset non-zero duration, e.g., of time. A duration of time may be calibrated to a rate of flow of the valve and a desired volume of inert ballast. From step 812, the method returns. In this way, a limited flow of inert ballast may be provided for an emission migration event of moderate priority, and by continually monitoring sensors as illustrated by the methods herein, the volume inert ballast may be intermittently pulsed, as determined by sensor signals. Returning to step 810, if priority level greater than level 2 is indicated, the method continues to step 814.

At step 814, the method determines the enclosure is priority level 3. In one example, priority level 3 may be highest priority. As an example, priority level 3 may include a high pressure enclosure with high likelihood of emission migration and/or enclose materials of greatest priority. If the enclosure is priority level 3, the method continues step 816.

At step 816, the method includes opening a ballast valve for a second threshold duration and diagnosing. In one example, the second threshold duration may be a preset non-zero threshold duration. In one example, the second threshold duration may be a second, longer, duration of time. A duration of time may be calibrated based on an estimate of travel time. A duration of time may be calibrated to a rate of flow of the valve and a desired, e.g., larger, volume of inert ballast. For example, the duration may be calibrated as a single operation that floods the enclosure. In some examples, the second threshold duration may be a continuous setting and the diagnosis may include a technician decision to close the valve. From step 816, the method returns. In this way, a larger volume and/or longer duration of inert ballast may be utilized for an emission migration event of greatest priority.

Returning to step 808, if a fill volume of the inert ballast reservoir greater than the first threshold volume is not indicated, the method continues to step 818. At step 818, the method includes determining if a fill volume of the inert ballast reservoir greater than a second threshold volume is indicated. In one example, the second threshold volume may be a preset non-zero threshold. In one example, the second threshold volume may be calibrated based conditions such as trip duration or enclosure size. In one example, the second threshold may include a relatively lower fill volume of the one or more tanks of the inert ballast reservoir. If a volume of the inert ballast reservoir greater than the second threshold volume is indicated, the method continues to step 820.

At step 820, the method includes determining if a priority level 3 is indicated for the enclosure. If priority level 3 is indicated, the method continues to step 816. At step 816, the method includes opening the ballast valve for a second threshold duration and diagnosing, as described previously. As an example, by determining the volume of inert ballast and the priority level of the enclosure, inert ballast use may be prioritized. In other examples, prioritizing inert ballast may allow a fixed supply to be used for the highest priority needs. In some examples, prioritizing inert ballast may allow a replenish-able supply to refill and be available for subsequent demands.

If a fill volume of the inert ballast reservoir greater than the second threshold is not indicated (e.g., the ballast reservoir is empty), the method continues to step 806. At step 806, the method includes continuous enclosure emission evacuation and diagnosis. For example, continuous enclosure emission evacuation for an enclosure with a blower may include operating the blower continuously until a destination is reached and/or a technician and/or operator may be available to assess the enclosure.

In this way, by evaluating one or more condition of the enclosure to determine priority level and estimating the availability of inert ballast, an additional control strategy may be utilized to mitigate emission migration. The one or more strategies may provide a means for the vehicle system to reach a destination and minimize service interruption.

Referring now FIG. 9, a timing diagram 900 is depicted showing an example prophetic operation of a method for a fuel system including a vacuum pump and an inert ballast reservoir, such as methods of FIG. 5 and FIG. 8, for a vehicle system. The horizontal axis (x-axis) denotes time and the vertical markers t1 through t7 identify reference times during the example prophetic operation. The following parameters are plotted as operating conditions to be read by a controller of the vehicle system during the example prophetic operation: vehicle speed 902, enclosure pressure sensor 906, emission sensor 908, a priority level 918, and a fill volume 920 of the inert ballast reservoir. A parameter for an on/off status of pump 904 indicates operation of a vacuum pump coupling an enclosure of the fuel system for evacuating the gaseous contents (e.g., emission, ambient air) of the enclosure. A parameter for an open/closed status of an inert ballast valve 922 of the inert ballast reservoir indicates control of a supply of inert ballast, e.g., inert gas. In one example, the fuel system for a vehicle system may be the same or similar as described in FIGS. 1-4. Vehicle speed may be estimated from a wheel speed sensor. The plots 902, 906, 908, and 920 increase upwards along the y-axis.

In one embodiment, the method for a fuel system including a vacuum pump and an inert ballast reservoir may indicate operation of the vacuum pump and/or inert ballast valve in response one or more conditions. In one example, pump operation may be indicated in response to air pressure within the enclosure greater than a threshold pressure, such as detected by a pressure sensor. Dashed line 910 denotes a first threshold air pressure (e.g., 2% below ambient air pressure). Air pressure greater than the first air pressure threshold may indicate pump operation (e.g., pump on) for a first threshold duration. In another example, the method may indicate pump operation in response to emission in the enclosure greater than a threshold emission, such as detected by an $H_2$ sensor measuring a ratio of $H_2$ to $O_2$. Dashed line 914 denotes a first threshold emission (e.g., 2% $H_2$). Emission greater than the first emission threshold may indicate use of the pump for a first threshold duration. Higher air pressured detected, e.g., greater than the second threshold pressure, may determine use pump for a second threshold duration. Dashed line 912 denotes a second threshold air pressure (e.g., 1% above ambient). Higher emissions detected, e.g., greater than the second threshold emission, may determine pump use for a second threshold duration. Dashed line 916 denotes a second threshold emission (e.g., 4% $H_2$). Following an indication of an enclosure sensor greater than a second threshold, the valve controlling the inert ballast reservoir may be opened to flow inert ballast into the enclosure. The duration of opening the inert ballast reservoir may be based on priority level of the enclosure and/or the fill volume of the ballast reservoir. A first inert ballast threshold volume 924 and a second, lower, inert ballast threshold volume 926 are shown.

At t0, the vehicle is moving a relatively slow speed. The enclosure pressure sensor detects enclosure air pressure below the first threshold pressure (e.g., 3% below ambient). The emission sensor is below the threshold emission (e.g., 0.5% $H_2$). Therefore, neither vacuum pump nor inert ballast use is indicated. As an example, with the vehicle in motion, airflow moving over one or more eductor tubes coupled to the vehicle exterior and the enclosure generates suction, drawing air from enclosure through the eductor tube, maintaining negative pressure below the first threshold pressure.

From t0 to t, the speed sensor detects decreasing vehicle speed. Enclosure air pressure increases. Emission is relatively low and flat. Conditions are not met indicating vacuum pump or inert ballast operation.

At t1, the vehicle speed sensor detects the vehicle at rest. In one example, reduced airflow moving past one or more eductor tubes reduces an amount of suction drawing air from the enclosure. The pressure sensor signals air pressure increasing above the first threshold pressure (e.g., enclosure air pressure rises above 2% below ambient). Thus, one or more of the conditions indicating pump operation is met. Emission is less than the threshold emission (e.g., 0.5%).

From t1 to t2, the pump is turned on for a first threshold duration (e.g., 5 minutes). In one example, the first threshold duration is calibrated to an estimate time to empty the gaseous contents of the enclosure. Electrical current is supplied to the pump. With the pump on, air is drawn from the enclosure to exit through the pump valve. The pressure sensor signals air pressure decreasing below the first threshold pressure (e.g., enclosure air pressure below 2% below ambient).

At t2, the pump is off. The vehicle is in motion and the eductor is drawing suction to maintain air pressure below the first threshold.

From t2 to t3, the vehicle speed increases, peaks, and decreases. The negative air pressure generated by the eductor pipe decreases with decreasing vehicle speed.

At t3, a pressure sensor indicates air pressure in the enclosure increasing above the first threshold (e.g., enclosure air pressure rises above 2% below ambient). Thus, one or more of the conditions indicating pump operation is met once more. The pump is turned on for the first threshold duration (e.g., 5 minutes).

From t3 to t4, the pump draws air through enclosure to exit through the pump valve for the first threshold duration. The pump is turned off. Air pressure decreases and, at t4, air pressure decreases below the first threshold pressure (e.g., enclosure air pressure below 2% below ambient).

From t4 to t5, vehicle speed increases. Air flow moves past the eductor tube, creating suction to circulate air through the enclosure. Air pressure remains negative and lower than the first threshold pressure. The emission sensor detects increasing emission.

At t5, emission increases above the second threshold, indicating pump use. The vacuum pump is turned on for a second threshold duration (e.g., 1 hour). In one example, the second threshold duration may be set based a duration of time to arrive at a service location.

From t5 to t6, the vacuum pump is operating for the second threshold duration. At t6, based on receiving an indication of emission greater than the second threshold, an additional strategy to control emissions is utilized. The enclosure is located. Based on the location of the enclosure, inert ballast volume greater than the first threshold volume (e.g., relatively full volume) is indicated. Based on the location and contents of the enclosure, the enclosure is prioritized at level 2, a moderate priority level. Based on the moderate priority level, the inert ballast valve is opened for a first, shorter, threshold duration of two possible threshold durations.

From t6 to t7, the inert ballast valve dispenses ballast to the enclosure and the pump is operating to circulate fresh air through the enclosure, reducing the emission level. The inert ballast volume decreases below the first threshold. A technician diagnoses the source of emission in the enclosure.

At t7, the emission sensor indicates emission below a first threshold.

Referring now FIG. 10, a timing diagram 1000 is depicted showing an example prophetic operation of a method for a fuel system including a blower and an inert ballast reservoir, such as methods of FIG. 6 and FIG. 8, for a vehicle system. The horizontal axis (x-axis) denotes time and the vertical markers t1 through t6 identify reference times during the example prophetic operation. The following parameters are plotted as operating conditions to be read by a controller of the vehicle system during the example prophetic operation: vehicle speed 1002, emission sensor 1006, a priority level 1014, and a fill volume 1016 of the inert ballast reservoir. A parameter for an on/off status of blower 1004 indicates operation of a blower coupling an enclosure of the fuel system for evacuating the gaseous contents (e.g., emission, ambient air) of the enclosure. A parameter for an open/closed status of an inert ballast valve 1018 of the inert ballast reservoir indicates control of a supply of inert ballast. Under some conditions, the inert ballast reservoir valve may be opened for a first or second threshold duration. Conditions may include priority level 1014 of the enclosure and the fill volume 1016 of inert ballast available to the enclosure. In this example, there are 3 priority levels, with level 1 the lowest priority and level 3 the highest priority. In one example, the fuel system for a vehicle system may the same or similar as described in FIGS. 1-4. The plots 1002, 1006, 1016 increase upwards along the y-axis.

In one embodiment, the method for a fuel system including a blower and an inert ballast reservoir may indicate operation of the blower and/or inert ballast valve in response one or more conditions. In one example, the blower and inert ballast reservoir may operate in conjunction with a passive ventilation system. When the vehicle is in motion, fresh air circulates through the enclosure via the passive ventilation system. If vehicle speed reduces substantially and/or emission is detected, blower use may circulate fresh airflow through the enclosure at a greater rate than the passive ventilation system. In one example, blower operation may be indicated in response to vehicle speed less than a threshold speed, such as estimated by a wheel speed sensor. Dashed line 1008 denotes a threshold vehicle speed (e.g., 10 miles per hour [mph]). In another example, the method may indicate blower operation in response to emission in the enclosure greater than a threshold emission, such as detected by an $H_2$ sensor measuring a ratio of $H_2$ to $O_2$. Dashed line 1010 denotes a first threshold emission (e.g., 2% $H_2$). Emission greater than the first emission threshold may indicate operation of the blower. Higher emissions detected, e.g., greater than the second threshold emissions, may determine blower operation and use of an inert ballast reservoir. Dashed line 1012 denotes a second threshold emission (e.g., 4% $H_2$). Following an indication of emission greater than the second threshold, the inert ballast valve may be opened to flow inert ballast into the enclosure. The duration of opening the inert ballast valve may be based on priority level of the enclosure and/or the fill volume of the ballast reservoir. A first inert ballast threshold volume 1020 and a second, lower, inert ballast threshold volume 1022 are shown.

At t0, the vehicle is moving at a relatively slow speed. The speed is less than the threshold speed and the blower is on. The emission sensor indicates emission less than the first threshold emission (e.g., 0.5% $H_2$).

From t0 to t, the speed sensor detects increasing vehicle speed. Emission remains below the threshold emission.

At t1, vehicle speed greater than the threshold speed is indicated. Emission greater than a threshold emission is not indicated, therefore the blower is turned off.

From t1 to t2, vehicle speed is relatively constant (e.g., 30 mph) and greater than the threshold. The emission sensor detects increasing emission.

At t2, the emission sensor indicates emission greater than the first threshold (e.g., 3% $H_2$). The blower is turned on. With the blower on, fresh air circulates through the enclosure and out through an exhaust vent. From t2 to t3, the emission sensor detects decreasing emission. At t3, emission falls below the first threshold. Vehicle speed less than the threshold speed is not indicated, therefore the blower is turned off.

From t3 to t4, vehicle speed is relatively constant and greater than the threshold speed. Passive ventilation is circulating air through the enclosure. An emission starts to accumulate at a rate greater than the passive circulation exhausts the contents of the enclosure. The emission sensor detects increasing emission.

At t4, emission increases above the second threshold, indicating blower use. The blower is turned on. In one example, the blower may be turned on for continuous use, e.g., until operator shut-off.

From t4 to t5, the blower is on. At t5, based on receiving an indication of emission greater than the second threshold an additional strategy to control emission is utilized. The enclosure is located. The fill volume of inert ballast volume less than the first threshold volume (e.g., less than full volume) is indicated. Based on the location and contents, the enclosure is prioritized at level 3, the highest priority level. Based on the highest priority level, the inert ballast valve is opened for a second, longer, threshold duration of two possible threshold durations.

From t5 to t6, the inert ballast valve controls the flow of inert ballast to the enclosure. The blower is circulating fresh air through the enclosure, reducing the emission level. The inert ballast volume decreases and remains above the second threshold. A technician diagnoses the source of emission in the enclosure.

At t6, the emission sensor indicates emission below a first threshold.

Referring now FIG. 11, a timing diagram 1100 is depicted showing an example prophetic operation of a method for a fuel system including an inert ballast reservoir, such as the method of FIG. 7, for a vehicle system. The horizontal axis (x-axis) denotes time and the vertical markers t1 through t7 identify reference times during the example prophetic operation. The following parameters are plotted as operating conditions to be read by a controller of the vehicle system during the example prophetic operation: enclosure sensor 1102 and heat sensor 1104. A parameter for an open/closed status of a valve 1106 of the inert ballast reservoir indicates control of a supply of inert ballast. Under some conditions, the inert ballast reservoir valve may be opened for a first or second threshold duration. In one embodiment, conditions may include type of sensor signal (e.g., pressure, emission, heat) and a threshold level (e.g., higher or lower).

In one embodiment, the method for a fuel system including an inert ballast reservoir may operate in conjunction with a passive ventilation system. A passive ventilation system may include an enclosure modified with an air vent and exhaust valve and/or eductor that circulates air through the enclosure with sufficient ambient airflow. In such an embodiment, the inert ballast reservoir may support the passive airflow modifications by introducing an additional strategy to reduce an air ratio of potential emission, either by providing a limited flow of inert gas in repeated operations (e.g., smaller pulses) or with larger volumes in single operations (e.g., floods). In one example, the method may indicate opening the inert ballast valve in response to an enclosure sensor signal greater than a threshold. As one example, a sensor may include an emission sensor, such as an $H_2$ sensor for measuring the air ratio of $H_2$ to $O_2$. Additionally or alternatively, pressure in an enclosure may be used to infer increasing emission. For example, increasing air pressure in an enclosure maintained at negative pressure may indicate increasing emission. Dashed line 1110 indicates a first threshold sensor signal (e.g., 2% $H_2$, air pressure equal to ambient). A sensor signal greater than the first threshold, but less than a second threshold, may indicate opening a valve controlling the inert ballast supply for a first threshold duration (e.g., 30 seconds). As one example, the first threshold duration may be set to a calibrated to flush the volume of the enclosure. A sensor signal greater than the second threshold and/or greater than threshold heat may determine opening the inert ballast valve for a second, longer, threshold duration (e.g., 3 hours). As one example, the second threshold duration may be calibrated to a time of travel to a service stop. Dashed line 1112 denotes the second threshold sensor value (e.g., 4% $H_2$, air pressure 2% over ambient). Dashed line 1114 denotes a threshold heat (e.g., 50° C.). In one example, the threshold heat may be calibrated to a temperature greater than average high daytime temperature.

At t0, an emission sensor indicates emission less than the first threshold emission (e.g., 0.5% $H_2$). The heat sensor indicates heat less than the threshold (e.g., 25° C.).

From t0 to t1, the emission sensor detects increasing emission in the enclosure. Heat remains below the threshold heat.

At t1, emission in the enclosure greater than the first threshold emission, but less than the second threshold emission, is indicated (e.g., 2.5% $H_2$). Therefore, one of the conditions indicating operation of the inert ballast valve is met. First threshold emission indicates opening of the inert ballast valve for the first threshold duration. The inert ballast valve is opened.

From t1 to t2, inert ballast is pulsed into the enclosure for the first threshold duration and the ballast valve is closed. The heat sensor remains relatively constant. The emission sensor detects increasing emission. At t2, greater than first threshold emission and less than the second emission is indicated. The inert ballast valve is opened again and inert ballast is pulsed into the enclosure for the first threshold duration again. The inert ballast valve is closed. The emission sensor detects decreasing emission.

At t3, emission in the enclosure less than the first threshold pressure is indicated (e.g., 0.5% $H_2$).

From t3 to t4, emission is stable and then increases. The heat sensor indicates relatively constant temperature.

At t4, greater than second threshold emission is indicated (e.g., air ratio rises above 4% $H_2$). Therefore, one of the conditions indicating operation of the inert ballast valve is met. Second threshold emission indicates use of the inert ballast valve for the second threshold duration. The inert ballast valve is opened.

From t4 to t5, a second threshold duration of inert ballast circulates the enclosure. As the ballast circulates through the enclosure for the second threshold duration (e.g., 3 hours), a technician may diagnose the source of the migrating emission. In one example, the technician completes a diagnosis and resolves the source of migrating emissions. The emission sensor detects decreasing emission.

At t5, the inert ballast valve is closed. The emission sensor detects emission less than the first threshold emission.

From t5 to t6, a pressure sensor detects increasing pressure and increasing heat.

At t6, an indication of pressure greater than the first threshold pressure and less than the second pressure is received (e.g., pressure rises above ambient). Heat greater than a threshold heat (e.g., 55° C.) is indicated. Therefore, two of the conditions indicating operation of the inert ballast valve are met. First threshold pressure and greater than threshold heat determine opening the inert ballast valve for the second threshold duration.

From t6 to t7, the inert ballast circulates through the enclosure. As the inert ballast circulates through the enclosure for the second threshold duration (e.g., 3 hours), a technician may diagnose the source of the pressure and heat. In one example, the technician completes a diagnosis and resolves the source of the sensor signals. The pressure sensor detects decreasing pressure and the heat sensor detects decreasing heat.

At t7, none of the plurality of enclosure sensors indicates greater than threshold signals.

In this way, a method for a fuel system of a vehicle system may enclose one or more gaseous fuels, components for fuel delivery and/or consumption elements such as an internal combustion engine and/or a fuel cell. By monitoring one or more of a plurality of sensor signals coupled to the enclosures, potential emission may be contained and potential emission migration mitigated. The technical effect of a method for managing a fuel system is enabling enclosure of fuel reservoirs, engines, fuel cells, and other system components, and reducing service interruption related emission migration events.

The disclosure also provides support for a method for managing a fuel system of a vehicle, comprising: enclosing, at least partially, a gaseous fuel delivery, storage, and/or consumption element of the vehicle, and sensing an indication of gaseous fuel in an unintended region, and generating an alert and/or adjusting an actuator in response to the sensed gaseous fuel above a threshold. In a first example of the method, the alert is provided to a vehicle operator. In a second example of the method, optionally including the first example, the actuator is adjusted to provide a displacement gas to within an enclosure of the at least partially enclosed gaseous fuel delivery, storage, and/or consumption element. The disclosure also provides support for the method of any of the above claims wherein the vehicle is a rail vehicle. The disclosure also provides support for the method of any of the above claims wherein the consumption element is one or more of, or combinations of, a fuel cell and an internal combustion engine. The disclosure also provides support for the method of any of the above claims wherein the gaseous fuel includes hydrogen. In a first example of the method, the actuator adjusts flow to an eductor, the eductor drawing fresh air into the enclosure. In a second example of the method, optionally including the first example, the flow to the eductor is generated by vehicle motion. In a third example of the method, optionally including one or both of the first and second examples, the flow to the eductor is exhaust gas flow from the consumption element. The disclosure also provides support for the method of any of the above claims further comprising venting gaseous fuel from the unintended region to atmosphere. The disclosure also provides support for the method of any of the above claims wherein the displacement gas includes inert gas. The disclosure also provides support for The method of any of the above claims wherein adjusting the actuator includes a first single operation that floods the unintended region with inert gas in response to a first higher level of sensed gaseous fuel in the unintended region, and a repeated operation that provide limited flow of inert gas to the unintended region in response to a second lower level of sensed gaseous fuel in the unintended region. The disclosure also provides support for the method of any of the above claims wherein the threshold is a ratio of hydrogen gas and oxygen. The disclosure also provides support for the method of any of the above claims wherein a plurality of sensors in the enclosure senses the gaseous fuel. The disclosure also provides support for the method of any of the above claims wherein the indication is a pressure drop of the gaseous fuel. The disclosure also provides support for the method of any of the above claims wherein the indication is a concentration of the gaseous fuel.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for managing a fuel system of a vehicle, comprising:
    sensing an indication of gaseous fuel in an unintended region associated with an at least partially enclosed gaseous fuel delivery, storage, and/or consumption element of the vehicle; and
    generating an alert and/or adjusting an actuator in response to the sensed gaseous fuel above a threshold.

2. The method of claim 1, wherein the alert is provided to a vehicle operator.

3. The method of claim 1, wherein the actuator is adjusted to provide a displacement gas to within an enclosure of the at least partially enclosed gaseous fuel delivery, storage, and/or consumption element.

4. The method of claim 3 wherein the displacement gas includes inert gas.

5. The method of claim 1 wherein the vehicle is a rail vehicle.

6. The method of claim 1 wherein the consumption element is one or more of, or combinations of, a fuel cell and an internal combustion engine.

7. The method of claim 1 wherein the gaseous fuel includes hydrogen.

8. The method of claim 1, wherein the actuator adjusts flow to an eductor, the eductor drawing fresh air into the enclosure.

9. The method of claim 8, wherein the flow to the eductor is generated by vehicle motion.

10. The method of claim 8, wherein the flow to the eductor is exhaust gas flow from the consumption element.

11. The method of claim 1 further comprising venting gaseous fuel from the unintended region to atmosphere.

12. The method of claim 1 wherein adjusting the actuator includes a first single operation that floods the unintended region with inert gas in response to a first higher level of sensed gaseous fuel in the unintended region, and a repeated operation that provides limited flow of inert gas to the unintended region in response to a second lower level of sensed gaseous fuel in the unintended region.

13. The method of claim 1 wherein the threshold is a ratio of hydrogen gas and oxygen.

14. The method of claim 1 wherein a plurality of sensors in the enclosure senses the gaseous fuel.

15. The method of claim 1 wherein the indication is a pressure drop of the gaseous fuel.

16. The method of claim 1 wherein the indication is a concentration of the gaseous fuel.

17. The method of claim 1 wherein the indication is a concentration of the gaseous fuel.

18. A system, comprising:
    a gaseous fuel delivery, storage, and/or consumption element of the vehicle;
    an enclosure at least partially enclosing one or more or combinations of the gaseous fuel delivery, storage, and/or consumption element of the vehicle;
    a sensor for sensing an indication of gaseous fuel in an unintended region of the vehicle; and a control system with instructions that when carried out generate an alert and/or adjust an actuator in response to sensed gaseous fuel above a threshold.

19. The system of claim 18, wherein the alert is provided to a vehicle operator, wherein the actuator is adjusted to provide a displacement gas to within the enclosure, wherein the displacement gas includes inert gas.

20. The system of claim 19 wherein the vehicle is a rail vehicle, wherein the consumption element is one or more of, or combinations of, a fuel cell and an internal combustion engine, and wherein the gaseous fuel includes hydrogen.

* * * * *